(12) United States Patent
Caggioni et al.

(10) Patent No.: US 9,088,403 B1
(45) Date of Patent: Jul. 21, 2015

(54) IDENTIFICATION CODEWORDS FOR A RATE-ADAPTED VERSION OF A DATA STREAM

(71) Applicant: APPLIED MICRO CIRCUTS CORPORATION, Sunnyvale, CA (US)

(72) Inventors: Francesco Caggioni, Winchester, MA (US); Dimitrios Giannakopoulos, Andover, MA (US)

(73) Assignee: Applied Micro Circuts Corporation, Sunnyvale, CA (US)

( * ) Notice: Subject to any disclaimer, the term of this patent is extended or adjusted under 35 U.S.C. 154(b) by 0 days.

(21) Appl. No.: 14/222,913

(22) Filed: Mar. 24, 2014

(51) Int. Cl.
*H04L 7/00* (2006.01)
*H04L 7/02* (2006.01)
*H04J 3/06* (2006.01)

(52) U.S. Cl.
CPC .................. *H04L 7/02* (2013.01); *H04J 3/0638* (2013.01)

(58) Field of Classification Search
CPC ....... H04L 7/02; H04L 7/0008; H04J 3/0638; H04J 3/0635; H04J 3/0685; H04J 3/0688
USPC .......... 375/356, 371, 373, 363, 372; 370/470, 370/428, 535
See application file for complete search history.

(56) References Cited

U.S. PATENT DOCUMENTS

| | | | |
|---|---|---|---|
| 4,661,966 A * | 4/1987 | Schreiner | ...................... 375/363 |
| 6,058,106 A | 5/2000 | Cudak et al. | |
| 7,114,058 B1 | 9/2006 | Trivedi et al. | |
| 7,305,540 B1 | 12/2007 | Trivedi et al. | |
| 7,672,416 B2 | 3/2010 | Hadzic et al. | |
| 7,681,013 B1 | 3/2010 | Trivedi et al. | |
| 7,890,840 B2 | 2/2011 | Khermosh et al. | |
| 8,254,241 B2 | 8/2012 | Branlund et al. | |
| 8,351,450 B2 * | 1/2013 | Kauschke et al. | ............ 370/428 |

* cited by examiner

*Primary Examiner* — Phuong Phu
(74) *Attorney, Agent, or Firm* — Amin, Turocy & Watson, LLP

(57) ABSTRACT

Various aspects provide for modifying a data stream for rate adaptation. A clock component receives a data stream at a first clock rate. In an aspect, a rate adaptation component inserts a first identification codeword into a particular location in the data stream based on a set of encoding rules in response to a determination that the first clock rate is lower than a second clock rate associated with a device configured for receiving a rate-adapted version of the data stream. In another aspect, the rate adaptation component removes a predefined codeword from the data stream and transforms another predefined codeword in the data stream into a second identification codeword in response to a determination that the first clock rate is greater than the second clock rate.

20 Claims, 18 Drawing Sheets

IDENTIFICATION CODEWORDS FOR A RATE-ADAPTED VERSION OF A DATA STREAM

TECHNICAL FIELD

The subject disclosure relates generally to networking, and more particularly to identification codewords for a rate-adapted version of a data stream.

BACKGROUND

Electronic communications, whether over a local or wide-area network or among components of a local bus, can involve a variety of programmed actions and/or protocols. For instance, programmed actions and/or protocols can facilitate timing for the transmission and/or reception of data (e.g., data signals). In one example, a network timing protocol can be implemented for clock synchronization between network devices and/or network components. In certain instances, a clock rate of a data signal can be modified via a rate adaptation process. Furthermore, in certain networks (e.g., an Ethernet network), a Synchronous Ethernet (SYNC-E) standard can be implemented to synchronize data signals within the network. However, current approaches for SYNC-E are based on recovery of a bit-rate for a data signal transmitted throughout the network. Therefore, each device in the network is required to run synchronously (e.g., every data signal in the network needs to be transmitted by an external clock), resulting in added cost to the network and/or decreased efficiency of the network.

The above-described description is merely intended to provide a contextual overview of current network systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a clock component and a rate adaptation component. The clock component is configured for receiving a data stream at a first clock rate. In an aspect, the rate adaptation component is configured for inserting a first identification codeword into a particular location in the data stream based on a set of encoding rules in response to a determination that the first clock rate is lower than a second clock rate associated with a device configured for receiving a rate-adapted version of the data stream. In another aspect, the rate adaptation component is configured for removing a predefined codeword from the data stream and transforming another predefined codeword in the data stream into a second identification codeword in response to a determination that the first clock rate is greater than the second clock rate.

In another example embodiment, a method comprises receiving a data stream in a computer system at a first clock rate. The method also comprises inserting a first identification codeword into a determined location in the data stream in the computer system in response to a determination that the first clock rate is lower than a second clock rate associated with a device configured for receiving a rate-adapted version of the data stream.

In yet another example embodiment, a system comprises a means for receiving a data stream at a first clock rate. The system also comprises a means for adding a first identification codeword into a valid location in the data stream based on a set of encoding rules in response to a determination that the first clock rate is lower than a second clock.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
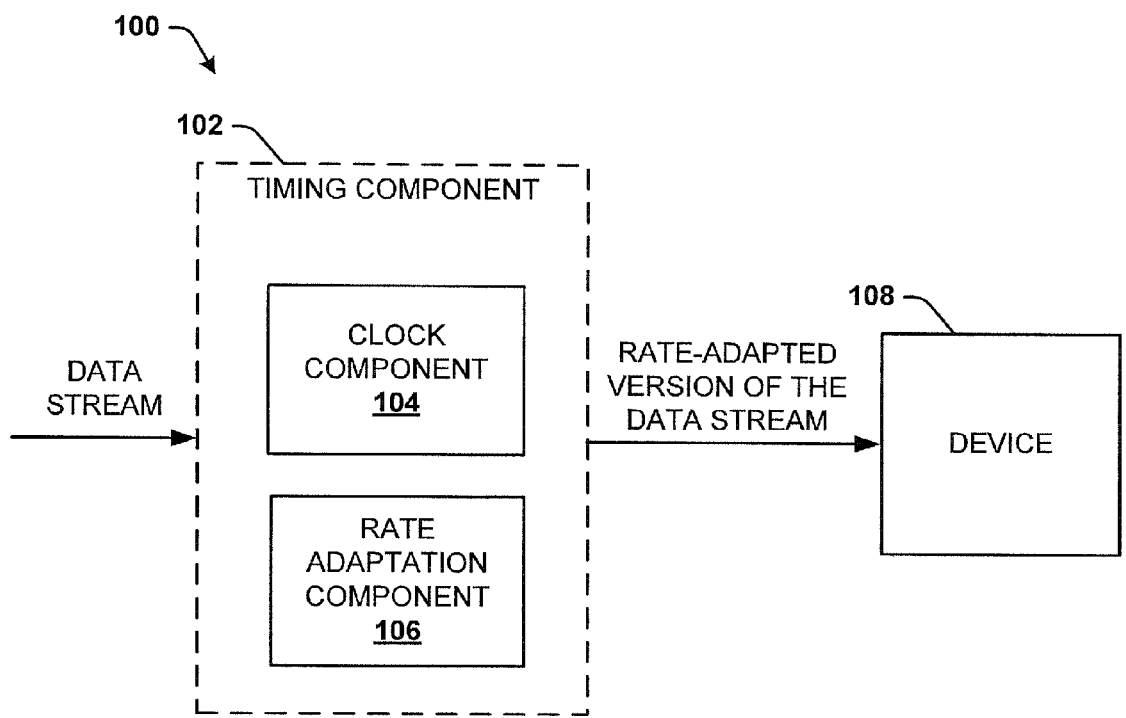
FIG. 1 is a block diagram illustrating an example, non-limiting embodiment of a rate adaptation system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide a system for modifying a data stream for rate adaptation. For example, identification codewords can be employed for a rate-adapted version of a data stream. As such, identification codewords can facilitate adapting a data rate of a data stream across two clock domains while also identifying predefined codewords that have been inserted and/or deleted due to clock rate adaptation. In an aspect, a first identification codeword can be inserted into a particular location in a data stream in response to a determination that a first clock rate is lower than a second clock rate associated with a device configured for receiving a rate-adapted version of the data stream (e.g., in response to a determination that a line clock is greater than a client clock). For example, the first identification codeword can be configured to indicate that a codeword has been inserted into the data stream by a rate adaptation process. In one example, the first identification codeword can be inserted into the particular location in the data stream based on a set of encoding rules and/or one or more algorithms.

In another aspect, a predefined codeword can be removed from the data stream and/or another predefined codeword in the data stream can be transformed into a second identification codeword in response to a determination that a first clock rate is higher than a second clock rate associated with a device configured for receiving a rate-adapted version of the data stream (e.g., in response to a determination that a line clock is lower than a client clock). For example, the second identification codeword can be configured to indicate that a codeword has been removed from the data stream by a rate adaptation process. Furthermore, the predefined codeword can indicate that a payload is not present in the data stream. Additionally or alternatively, the predefined codeword can indicate presence of an ordered set in the data stream. In one example, selection of a predefined codeword in the data stream to be transformed into the second identification codeword can be determined based on a set of encoding rules and/or one or more algorithms.

Therefore, codewords in a data stream that are associated with an idle period between data transmissions (e.g., an inter-packet gap) in a data stream can be differentiated from other codewords (e.g., identification codewords) in the data stream that are inserted and/or deleted due to rate adaptation (e.g., a clock rate adaptation process). Accordingly, timing throughout a network (e.g., an Ethernet network) can be maintained without implementing predetermined frames and/or timing protocols above a physical coding sublayer of the network. Moreover, a device implemented on a first end of a network (e.g., a client-side interface) and another device implemented on another end of the network (e.g., a line-side interface) can be timing aware, while a remaining portion of the network (e.g., other network devices in the network) can continue to operate asynchronously.

Turning now to FIG. 1, a block diagram illustrating an example, non-limiting embodiment of a network system in accordance with various aspects described herein is shown. System 100 includes a timing component 102. The timing component 102 can include a clock component 104 and a rate adaptation component 106. In one example, the system 100 can be implemented in a data communication system and/or a telecommunication system. For example, the system 100 can be implemented in and/or in connection with an Ethernet network system, an optical transport network (OTN) system, a Fibre Channel (FC) system and/or another type of network system. However, it is to be appreciated that the system 100 can be implemented as a different type of network system. Furthermore, it is to be appreciated that the system 100 can be associated with more than one type of data communication system and/or telecommunication system. In another example, the system 100 can be associated with a multi-link gearbox (MLG) standard.

In an aspect, the timing component 102 can be implemented on and/or in connection with a system interface, a client interface, a host interface and/or a line interface. The timing component 102 can be implemented on a transmitter device, a receiver device and/or a transceiver device. In an embodiment, rate-adaptation (e.g., at least the rate adaptation component 106) can be implemented on a transmitter device, a receiver device and/or a transceiver device. Additionally, the device 108 can be implemented on a receiver device and/or a transceiver device. In one example, the timing component 102 can be implemented on a transmitter device and the device 108 can be implemented on a receiver device. In another example, the timing component 102 can be implemented on a client-side interface and the device 108 can be implemented on a line-side interface.

The timing component 102 (e.g., the clock component 104) can receive a data stream (e.g., DATA STREAM shown in FIG. 1). The data stream can be received at a first clock rate (e.g., a client clock rate, a client-side clock rate, etc.). As such, the clock component 104 can be configured to determine the first clock rate (e.g., a first clock rate value) associated with the data stream. In one embodiment, the data stream can be generated by a transmitter device. In another embodiment, the data stream can be generated by a receiver device. For example, the data stream can be generated by a processor. In another example, the data stream can be generated by a network processing unit (NPU). In yet another example, the data stream can be generated by a media access control (MAC) device. In an aspect, the data stream can be implemented as an Ethernet signal, a Fibre Channel (FC) signal, an optical transport network (OTN) signal, a synchronous optical networking (SONET/SDH) signal and/or another type of signal.

The data stream can be an encoded data stream (e.g., an encoded signal). In an aspect, the data stream can be associated with a physical coding sublayer (PCS) encoding scheme. For example, the data stream can include a plurality of PCS blocks (e.g., a plurality of PCS codewords). As such, the data stream can be a serial stream of formatted blocks (e.g., codewords). For example, the data stream can be a serial stream of 64B/66B formatted blocks (e.g., a 64B/66B encoded signal), a serial stream of 8B/10B formatted blocks (e.g., an 8B/10B encoded signal), etc. However, it is to be appreciated that the data stream can be associated with a different PCS encoding scheme.

Furthermore, the data stream can include at least one or more formatted blocks that indicate that a payload is not present in the data stream. For example, the data stream can include at least one idle block that can be configured as a PCS idle codeword. The at least one idle block can indicate that a payload is not present at a particular portion of the data stream. In an aspect, the data stream can implemented without a data packet. For example, the data stream can be a data stream of idle blocks. In another example, the data stream can be a data stream of ordered set (OSET) blocks. In another aspect, the data stream can be associated with one or more data packets (e.g., a current data packet, a previous data packet, etc.). For example, the data stream can include, but is not limited to, one or more idle blocks, one or more data blocks, one or more start of packet (SOP) blocks and/or one or more end of packet (EOP) blocks. In one example, data packets included in the data stream can be separated by an inter-packet gap (IPG) that includes one or more idle blocks. For example, a current packet can include a SOP block, one or more data blocks and an EOP block. Furthermore an IPG can separate the current data packet from a previous data packet that includes a SOP block, one or more data blocks and an EOP block.

The rate adaptation component 106 can be configured for rate adaptation (e.g., to rate-adapt the data stream). For example, the rate adaptation component 106 can be configured to adapt the first clock rate based on a second clock rate (e.g., a line clock rate, a line-side clock rate, etc.). The second clock rate can be associated with a device 108 configured for receiving the data stream (e.g., a rate-adapted version of the data stream). For example, the second clock rate can be a clock rate required by the device 108 and/or required by a communication line associated with the device 108. In an aspect, the device 108 can be associated with a receiver device. In one example, the device 108 can transmit the rate-adapted version of the data stream (e.g., RATE-ADAPTED VERSION OF THE DATA STREAM shown in FIG. 1) to another device (e.g., a digitally controlled oscillator, a phase-locked loop, etc.) that can generate (e.g., recreate) a clock value for one or more other data streams. In another example, the device 108 can be configured to generate (e.g., recreate) a clock value for one or more other data streams. In an aspect, the timing component 102 can transmit the rate-adapted version of the data stream to the device 108 via a network (e.g., one or more other devices in a network system). As such, the timing component 102 can be implemented on a first end of a network (e.g., a client-side interface) and the device 108 can be implemented on another end of the network (e.g., a line-side interface). Accordingly, the timing component 102 and the device 108 can be timing aware, while a remaining portion of the network (e.g., other network devices in the network) can continue to operate asynchronously. It is to be appreciated that the device 108 can include one or more devices.

In an aspect, the rate adaptation component 106 can insert a first identification codeword (e.g., idle-plus codeword) into a particular location (e.g., a determined location, a valid location, etc.) in the data stream in response to a determination that the first clock rate is lower than the second clock rate associated with the device 108. For example, the rate adaptation component 106 can insert a first identification codeword into a particular location in the data stream in response to a determination that a write clock associated with the timing component 102 is lower than (e.g. slower than) a read clock associated with the timing component 102. In an aspect, the rate adaptation component 106 can insert the first identification codeword into a valid position (e.g., the particular location) of the data stream based on a set of encoding rules and/or one or more algorithms in response to the determination that the first clock rate is lower than the second clock rate.

The first identification codeword can be configured to indicate that a codeword has been inserted into the data stream by a rate adaptation process. In an aspect, the first identification codeword can be a control block associated with rate adaptation. For example, the first identification codeword can be a control block associated with a standard for defining media access control (MAC) of a physical layer and/or a data link layer (e.g., associated with Ethernet, etc.). In an aspect, the first identification codeword can comprise a total number of identification codewords (e.g., first identification codewords) inserted into the data stream. The first identification codeword can include identification information (e.g., a tag, an identifier, etc.), information associated with rate adaptation and/or other information. It is to be appreciated that a block type for the first identification codeword can be determined based on a particular implementation of the data stream.

In another aspect, the rate adaptation component 106 can remove a predefined codeword from the data stream and/or transform another predefined codeword in the data stream into a second identification codeword (e.g., an idle-minus codeword) in response to a determination that the first clock rate is greater than the second clock rate. For example, the rate adaptation component 106 can remove a first identification codeword from a particular location in the data stream in response to a determination that a write clock associated with the timing component 102 is greater than (e.g. faster than) a read clock associated with the timing component 102.

In an aspect, the rate adaptation component 106 can select the other predefined codeword in the data stream to be transformed into the second identification codeword based on a set of encoding rules and/or one or more algorithms. In one example, the rate adaptation component 106 can store information associated with the predefined codeword until a first opportunity to transform the other predefined codeword is available. For example, the rate adaptation component 106 can store the information associated with the predefined codeword in a state machine (e.g., a finite state machine).

In another aspect, the rate adaptation component 106 can remove a previously inserted identification codeword (e.g., a first identification codeword) from the data stream and/or transform another predefined codeword in the data stream into a second identification codeword in response to a determination that the first clock rate is greater than the second clock rate and that the data stream comprises the previously inserted identification codeword (e.g., a first identification codeword was previously inserted into the data stream). In one example, the rate adaptation component 106 can store information associated with a previously inserted identification codeword (e.g., a first identification codeword) until a first opportunity to transform the other predefined codeword is available. For example, the rate adaptation component 106 can store the information associated with a previously inserted identification codeword (e.g., first identification codeword) in a state machine (e.g., a finite state machine).

The second identification codeword can be configured to indicate that a codeword has been removed from the data stream by a rate adaptation process. In an aspect, the second identification codeword can be a control block associated with rate adaptation. For example, the second identification codeword can be a control block associated with a standard for defining MAC of a physical layer and/or a data link layer (e.g., associated with Ethernet, etc.). In an aspect, the second identification codeword can comprise a total number of codewords (e.g., predefined codewords, idle blocks, etc.) removed from the data stream. In one example, a predefined codeword can indicate that a payload is not present at a particular portion of the data stream. In another example, a predefined codeword can indicate presence of an ordered set at a particular portion of the data stream. The second identification codeword can include identification information (e.g., a tag, an identifier, etc.), information associated with rate adaptation, information associated with a removed codeword, and/or other information. It is to be appreciated that a block type for the first identification codeword can be determined based on a particular implementation of the data stream.

As such, the timing component 102 (e.g., the rate adaptation component 106) can transmit a rate-adapted version of the data stream (e.g., a modified version of the data stream) at the second clock rate. Furthermore, the device 108 can generate (e.g., recreate) one or more data streams that corresponds to the data stream received by the timing component 102 (e.g., the clock component 104). For example, the device 108 can generate (e.g., recreate) one or more data streams at the first clock rate (e.g., without any identification codewords).

Figure 2:
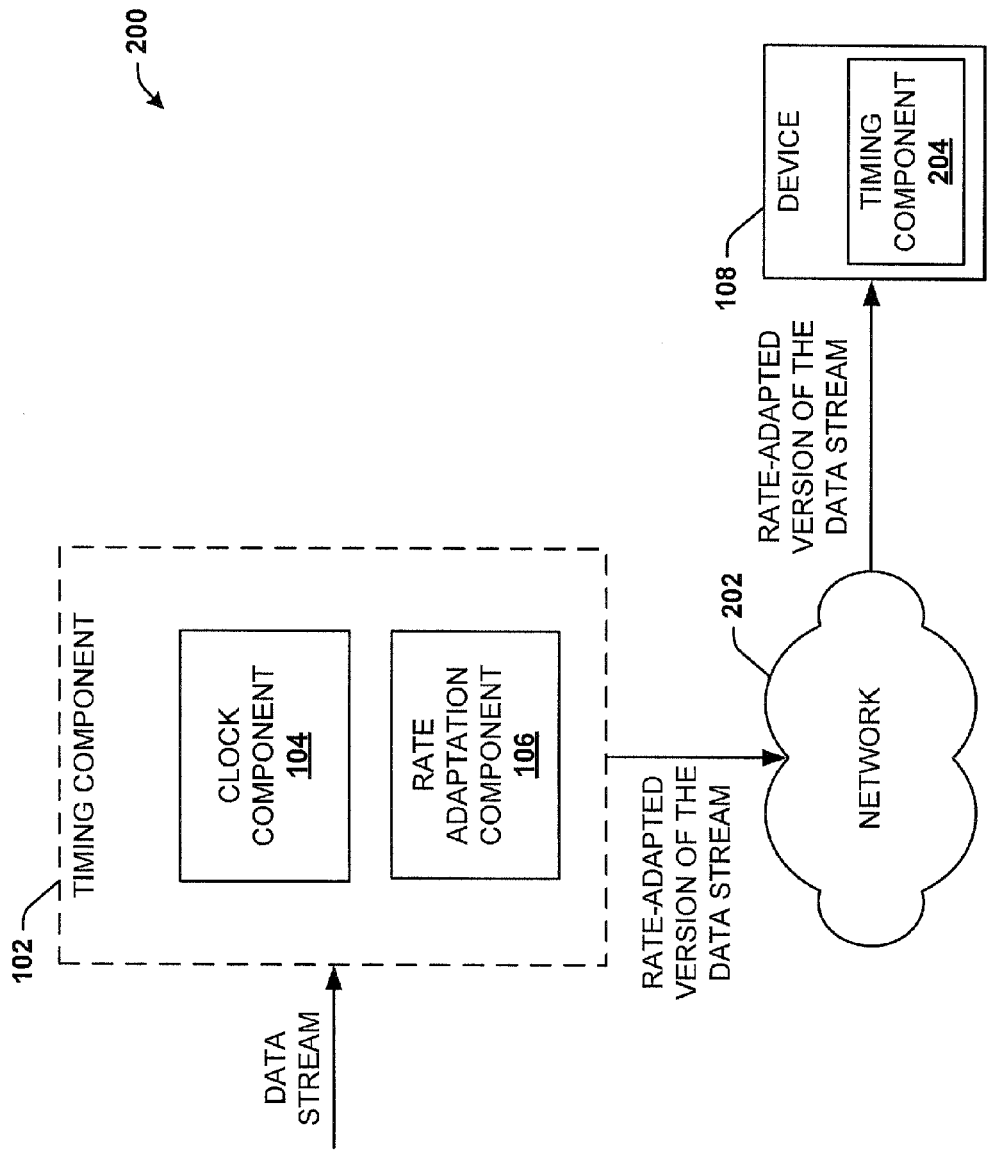
FIG. 2 is a block diagram illustrating another example, non-limiting embodiment of a rate adaptation system in accordance with various aspects described herein.

Referring now to FIG. 2, a block diagram illustrating another example, non-limiting embodiment of network system in accordance with various aspects described herein is shown. System 200 includes the timing component 102 and the device 108. The timing component 102 can include the clock component 104 and the rate adaptation component 106.

The timing component 102 can transmit the rate-adapted version of the data stream to the device 108 via a network 202. In an aspect, the timing component 102 can be implemented on a first end of the network 202 and the device 108 can be implemented on a second end of the network 202. For example, the timing component 102 and the device 108 can be implemented synchronously and the network 202 can be implemented asynchronously.

The network 202 can be implemented as and/or in connection with an Ethernet network, an OTN network, a FC network and/or a SONET/SDH network. For example, the network 202 can include one or more Ethernet network devices, one or more OTN network devices, one or more FC network devices and/or SONET/SDH network devices. However, it is to be appreciated that the network 202 can be implemented as and/or in connection with a different type of network and/or different network devices. Therefore, the network 202 can be a packet switched network and/or a circuit switched network. In an aspect, the network 202 can be a data communication network and/or a telecommunication network.

In an aspect, the device 108 can be configured to recreate a data stream that corresponds to the data stream received by the timing component 102. For example, the device 108 can include a timing component 204. In an aspect, the timing component 204 can be configured to extract first identification codeword(s) and/or second identification codeword(s) from the rate-adapted version of the data stream transmitted by the timing component 102 (e.g., received by the device 108). As such, the timing component 102 and the device 108 (e.g., the timing component 204) can be configured to be aware of and/or determine the original clock rate (e.g., the first clock rate) associated with the rate-adapted version of the data stream, while the network 202 (e.g., other network devices in the network 202) can continue to operate asynchronously (e.g., without being aware of the original clock rate associated with the rate-adapted version of the data stream).

In an aspect, the device 108 can be associated with one or more devices configured to recreate a clock rate (e.g., the first clock rate) of the data stream for one or more other data streams. In one example, the device 108 can be associated with a digitally controlled oscillator (DCO). In another example, the device 108 can be associated with a phase-locked loop (PLL).

Figure 3:
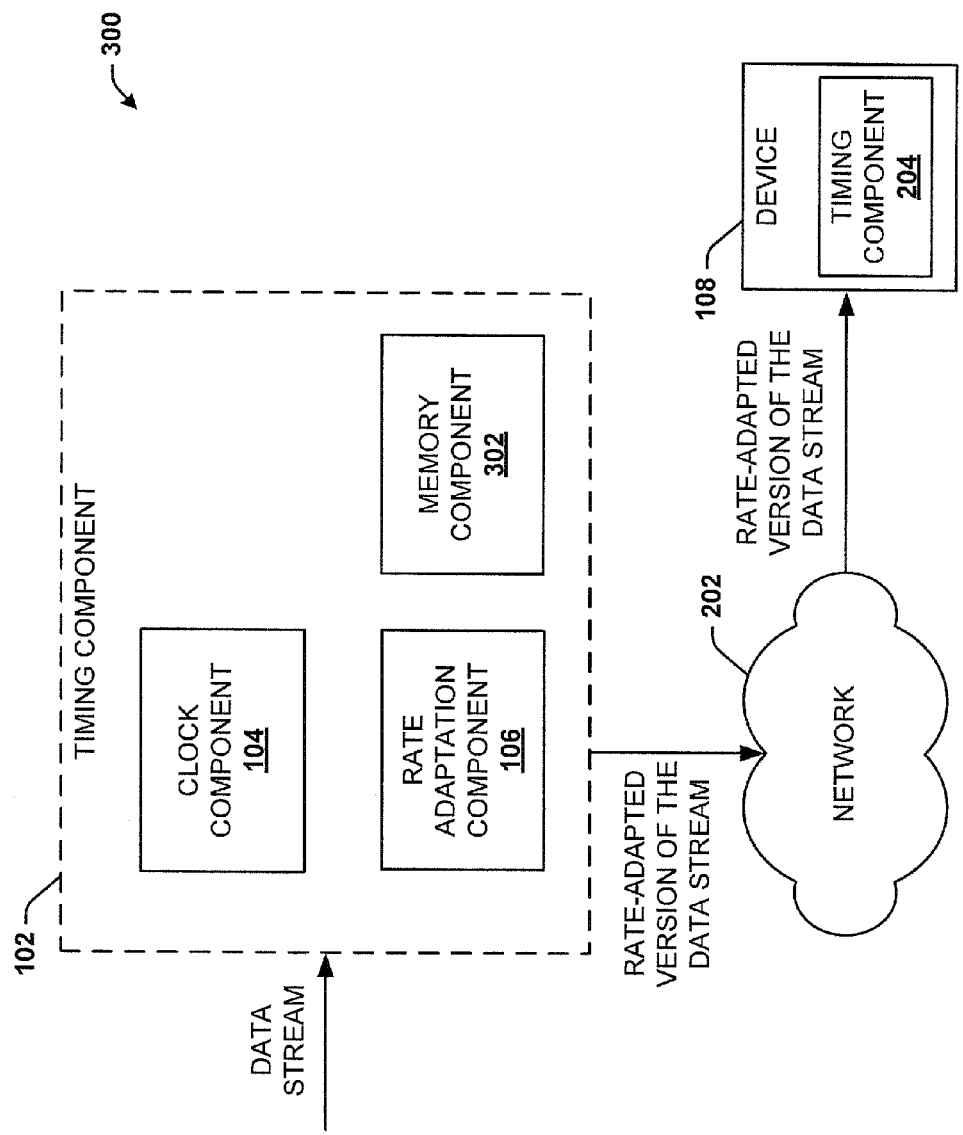
FIG. 3 is a block diagram illustrating yet another example, non-limiting embodiment of a rate adaptation system in accordance with various aspects described herein.

Referring now to FIG. 3, a block diagram illustrating another example, non-limiting embodiment of network system in accordance with various aspects described herein is shown. System 300 includes the timing component 102 and the device 108. The timing component 102 can include the clock component 104, the rate adaptation component 106 and a memory component 302.

The memory component 302 can be configured to store information associated with the data stream (e.g., a formatted block of the data stream) and/or rate adaptation. For example, the memory component 302 can store information associated with a predefined codeword of the data stream (e.g., an idle block of the data stream). In another example, the memory component 302 can store information associated with a first identification codeword of the data stream (e.g., an idle-plus block of the data stream). In an aspect, the memory component 302 can store information associated with a deleted (e.g., a removed) formatted block of the data stream. In one example, the memory component 302 can store information associated with a predefined codeword that is removed from the data stream. In another example, the memory component 302 can store information associated with a previously inserted identification codeword (e.g., a first identification codeword) that is removed from the data stream.

Furthermore, the memory component 302 can store information associated with the predefined codeword and/or a previously inserted identification codeword (e.g., a first identification codeword) until a first opportunity to transform the other predefined codeword is available. Furthermore, the memory component 302 can add the information associated with the predefined codeword and/or a previously inserted identification codeword (e.g., a first identification codeword) into the other predefined codeword when the first opportunity to transform the other predefined codeword is available. In an aspect, the memory component 302 can implement one or more algorithms to determine when the first opportunity to transform the other predefined codeword is available. In an example, the memory component 302 can store information associated with the predefined codeword and/or a previously inserted identification codeword (e.g., a first identification codeword) until a next predefined codeword in the data stream. In one example, the predefined codeword and/or a previously inserted identification codeword (e.g., a first identification codeword) can be associated with a first IPG in the data stream, and the next predefined codeword can be associated with a second IPG in the data stream. As such, the memory component 302 can add information related to a predefined codeword and/or a previously inserted identification codeword associated with a first IPG into a next predefined codeword associated with a second IPG. In another aspect, the memory component 302 can include and/or be associated with a state machine (e.g., a finite state machine). For example, the memory component 302 can store the information associated with a predefined codeword in a state machine. Additionally or alternatively, the memory component 302 can store the information associated with a previously inserted identification codeword (e.g., a first identification codeword) in a state machine.

Figure 4:
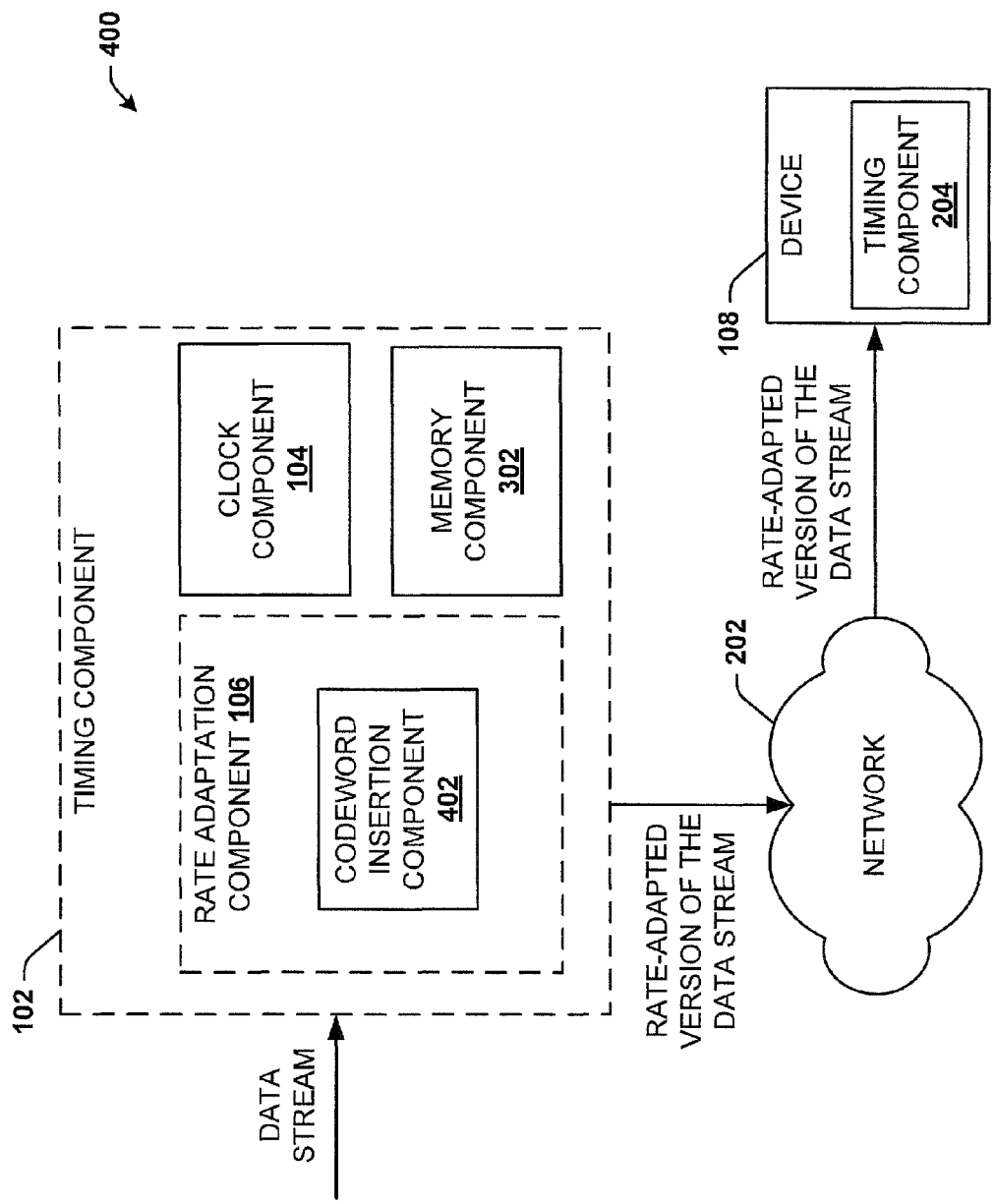
FIG. 4 is a block diagram illustrating yet another example, non-limiting embodiment of a rate adaptation system in accordance with various aspects described herein.

Referring now to FIG. 4, a block diagram illustrating an example, non-limiting embodiment of a rate adaptation component implemented in a network system in accordance with various aspects described herein is shown. System 400 includes the timing component 102 and the device 108. The timing component 102 can include the clock component 104, the rate adaptation component 106 and/or the memory component 302. The rate adaptation component 106 can include at least a codeword insertion component 402.

The codeword insertion component 402 can be configured to insert a codeword into the data steam for rate adaptation. In one example, the codeword insertion component 402 can be configured to insert a first identification codeword into the data steam. For example, the first identification codeword can be an idle-plus codeword that identifies an idle codeword (e.g., uniquely identifies an idle block) that has been inserted by a rate adaptation process via the codeword insertion component 402. An idle codeword can be a codeword (e.g., a PCS codeword) that indicates that no payload is present at a particular location in the data stream. In one example, the idle codeword can be included in an IPG of the data stream. In another example, the idle codeword can be included in a data stream that exclusively comprises idle codewords.

In an aspect, the codeword insertion component 402 can insert a first identification codeword into a particular location (e.g., a determined location) in the data stream in response to a determination that the first clock rate is lower than a second clock rate associated with the device 108. For example, the codeword insertion component 402 can insert the first identification codeword into a valid position of the data stream in response to the determination that the first clock rate is lower than the second clock rate. In an aspect, the codeword insertion component 402 can insert a first identification codeword into the valid location in the data stream based on a set of encoding rules. In an aspect, the valid position of the data steam can be determined by a codeword insertion algorithm. In one example, the valid position can be a first available location in the data stream. However, it is to be appreciated that a valid position can be a different location in a data stream.

In one example, the codeword insertion component 402 can insert the first identification codeword into a data stream that does not include a data packet. As such, the codeword insertion component 402 can insert a first identification codeword into data stream that exclusively comprises idle codewords. Alternatively, the codeword insertion component 402 can insert the first identification codeword into a data stream that exclusively comprises ordered set codewords. In another example, the codeword insertion component 402 can insert the first identification codeword into a data stream that includes at least one data packet. As such, the codeword insertion component 402 can insert a first identification codeword into an IPG associated with the data packet in response to a determination that the first clock rate is lower than a second clock rate associated with the device 108. In one example, the IPG can be located in the data stream before the data packet. In another example, the IPG can be located in the data stream after the data packet. As such, in one example, the codeword insertion component 402 can insert the first identification codeword at a beginning of an IPG. In another example, the codeword insertion component 402 can insert the first identification codeword at an end of an IPG. In yet another example, the codeword insertion component 402 can insert the first identification codeword between a beginning and an end of an IPG. However, it is to be appreciated that the codeword insertion component 402 can insert the first identification codeword at a different location in an IPG.

Figure 5:
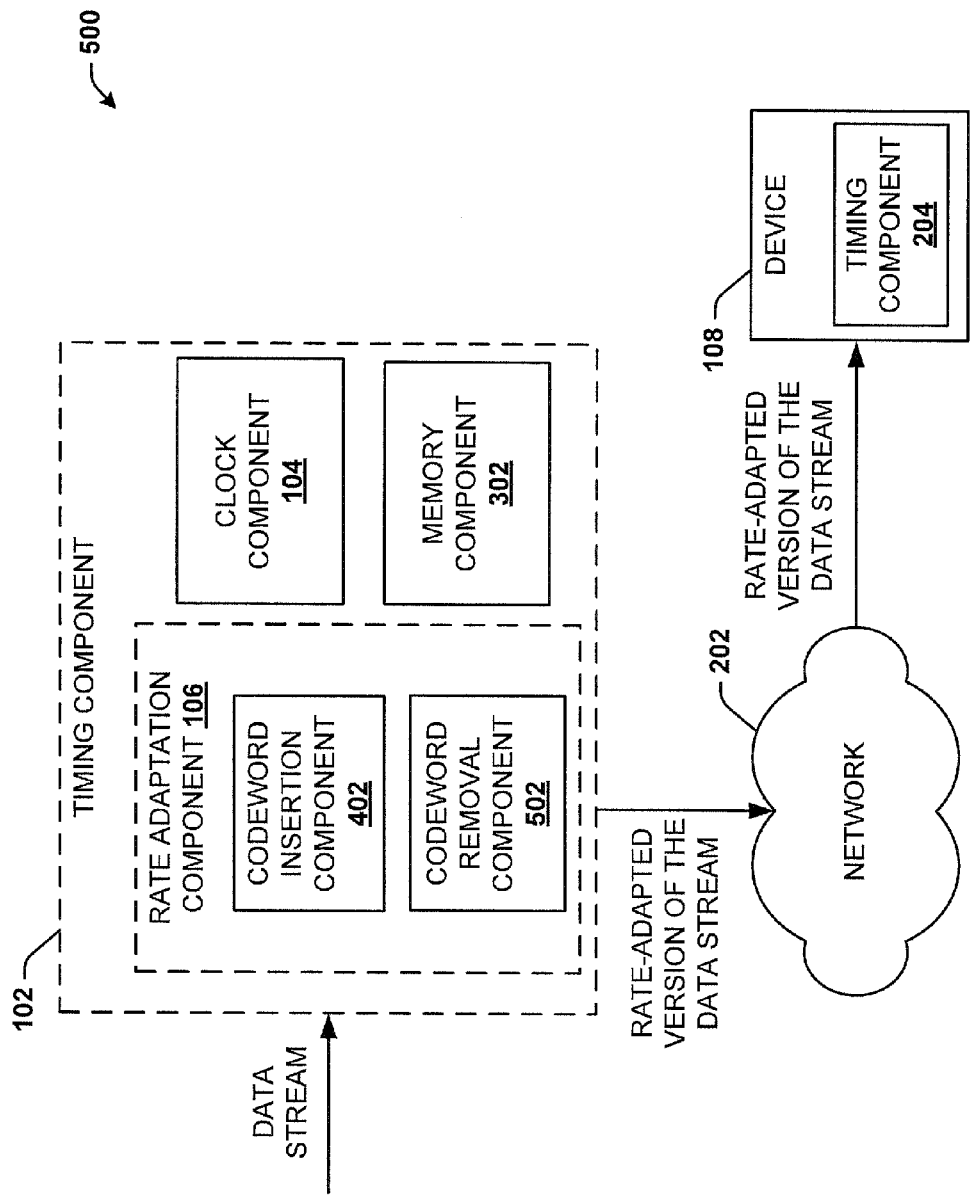
FIG. 5 is a block diagram illustrating yet another example, non-limiting embodiment of a rate adaptation system in accordance with various aspects described herein.

Referring now to FIG. 5, a block diagram illustrating another example, non-limiting embodiment of a rate adaptation component implemented in a network system in accordance with various aspects described herein is shown. System 500 includes the timing component 102 and the device 108. The timing component 102 can include the clock component 104, the rate adaptation component 106 and/or the memory component 302. The rate adaptation component 106 can include at least the codeword insertion component 402 and/or a codeword removal component 502.

The codeword removal component 502 can be configured to remove a codeword from the data steam for rate adaptation. In one example, the codeword removal component 502 can be configured to remove a predefined codeword from the data steam. For example, the predefined codeword can be an idle codeword (e.g., an idle PCS codeword) that indicates that no payload is present at a particular location in the data stream. In another example, the predefined codeword can be a ordered set (OSET) codeword (e.g., an ordered set PCS codeword) that indicates presence of ordered sets at a particular location in the data stream. Additionally, the codeword removal component 502 can be configured to transform another predefined codeword in the data stream into a second identification codeword. For example, the second identification codeword can be an idle-minus codeword that identifies an idle codeword (e.g., uniquely identifies an idle code) that has been removed (e.g., deleted) by a rate adaptation process via the codeword removal component 502. Alternatively, the codeword removal component 502 can be configured to transform another predefined codeword in the data stream into a third identification codeword. For example, the third identification codeword can be an OSET-minus codeword that identifies an OSET codeword that has been removed (e.g., deleted) by a rate adaptation process via the codeword removal component 502.

In an aspect, the codeword removal component 502 can remove a predefined codeword from the data stream in response to a determination that the first clock rate is greater than the second clock rate. Additionally, the codeword removal component 502 can transform another predefined codeword in the data stream into a second identification codeword and/or a third identification codeword in response to the determination that the first clock rate is greater than the second clock rate. In an aspect, the codeword removal component 502 can select the other predefined codeword in the data stream to be transformed into the second identification codeword and/or the third identification codeword based on a set of encoding rules. In another aspect, the codeword removal component 502 can select the other predefined codeword in the data stream to be transformed into the second identification codeword and/or the third identification codeword based on a codeword removal algorithm (e.g., a codeword removal algorithm associated with the memory component 302)

Furthermore, the memory component 302 can store information associated with the predefined codeword until a first opportunity to transform the other predefined codeword is available in the data stream. For example, the memory component 302 can store information associated with the predefined codeword until a next predefined codeword is available in the data stream. In one example, the data stream can include at least a current data packet and a previous data packet. As such, the codeword removal component 502 can remove a first codeword from a first IPG associated with a current data packet and/or insert a second identification codeword into a second IPG associated with the current data packet in response to a determination that the first clock rate is greater than the second clock rate. For example, the second IPG can be located in the data stream after the current data packet. Accordingly, the memory component 302 can store information associated with the predefined codeword until an initial codeword associated with the second IPG is received.

Figure 6:
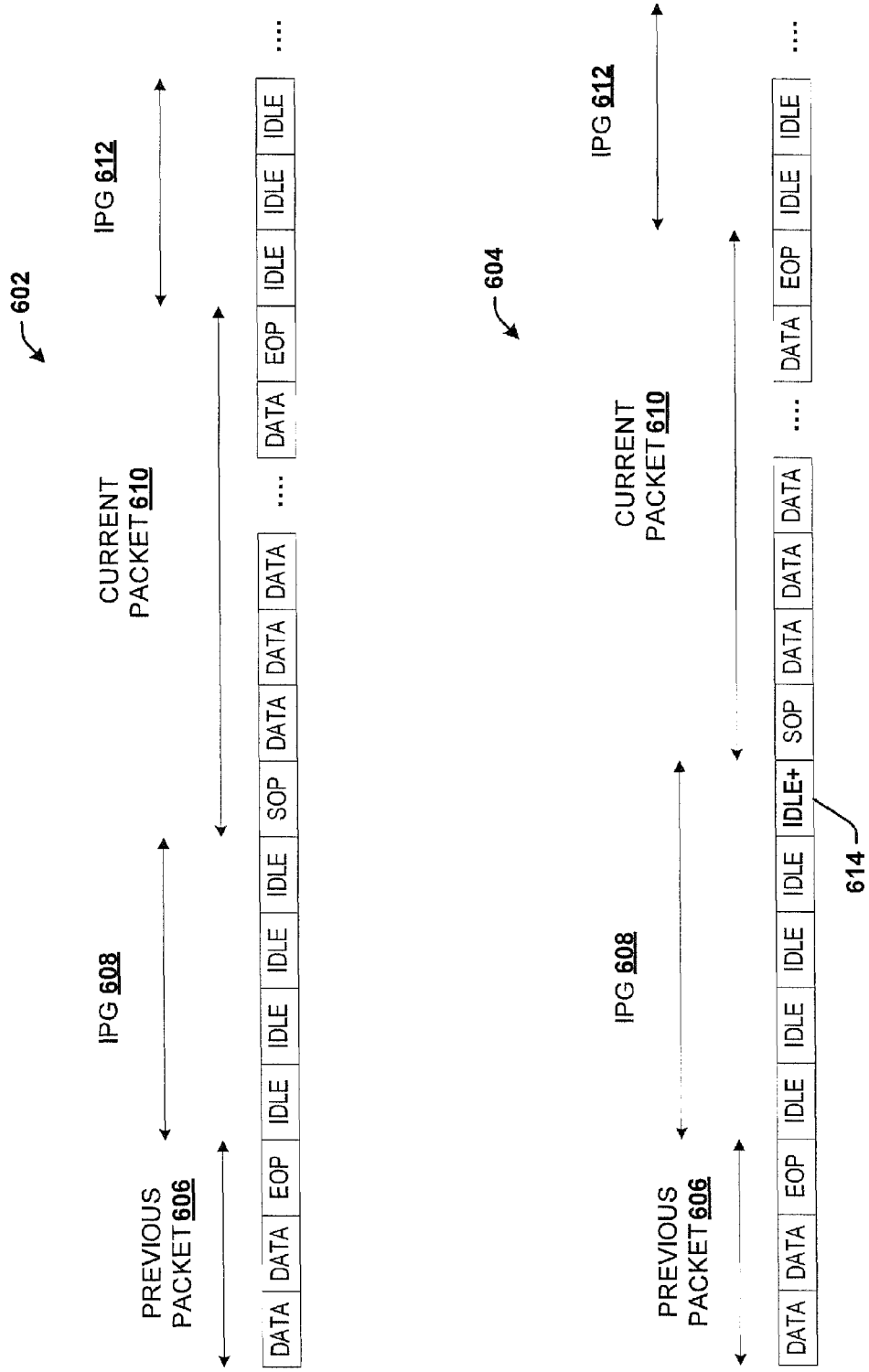
FIG. 6 is a diagram illustrating an example, non-limiting embodiment of a codeword insertion process for rate adaptation in accordance with various aspects described herein.

Referring now to FIG. 6, a diagram illustrating an example, non-limiting embodiment of a data stream 602 and a modified version of the data stream 604 in accordance with various aspects described herein is shown. For example, FIG. 6 can illustrate a codeword insertion process for a data stream (e.g., a codeword insertion process associated with the rate adaptation component 106 and/or the codeword insertion component 402). In the non-limiting example shown in FIG. 6, the data stream 602 includes a previous packet 606, an inter-packet gap (IPG) 608, a current packet 610 and an IPG 612. For example, the previous packet 606 can be a previous data packet in the data stream 602 and the current packet 610 can be a current data packet in the data stream 602. The previous packet 606 includes a start of packet (SOP) block (not shown), a plurality of data blocks and an end of packet (EOP) block. The IPG 608 includes a plurality of idle blocks (e.g., a plurality of idle codewords). For example, the IPG 608 can include four idle blocks. The current packet 610 includes a SOP block, a plurality of data blocks and an EOP block. The IPG 612 includes a plurality of idle blocks.

The data stream 602 can be transformed into the modified version of the data stream 604 for rate adaptation. For example, the data stream 602 can be a data stream before rate adaptation and the modified version of the data stream 604 can be a data stream (e.g., the data stream 602) after rate adaptation. As such, the modified version of the data stream 604 can be a rate-adapted version of a data stream. In the non-limiting example shown in FIG. 6, a codeword 614 (e.g., a first identification codeword, an idle+ codeword, etc.) can be added to the data stream 602. As such, the modified version of the data stream 604 can include the codeword 614. For example, the codeword 614 can be added to the IPG 608. As such, the IPG 608 of the modified version of the data stream 604 can include four idle blocks and the codeword 614 (e.g., the first identification codeword, the idle+ codeword, etc.).

The codeword 614 can identify a codeword that has been inserted by a rate adaptation process. In an aspect, the codeword 614 can be inserted into the data stream 602 in response to a determination that a clock rate of the data stream 602 is lower than a clock rate associated with a device configured for receiving the data stream 602 (e.g., the modified version of the data stream 604). In one example, the codeword 614 can be inserted into the data stream 602 (e.g., the IPG 608) based on a set of encoding rules. For example, a location of the codeword 614 in the IPG 608 can be determined based on a set of encoding rules. In another example, a location of the codeword 614 in the IPG 608 can be determined based on an algorithm (e.g., a codeword insertion algorithm, etc.). In the non-limiting example shown in FIG. 6, the codeword 614 is located at an end position of the IPG 608. However, it is to be appreciated that the codeword 614 can be located at a different position of the IPG 608 (e.g., at a beginning position of the IPG 608, at a position between a beginning position and an end position of the IPG 608, etc.).

Figure 7:
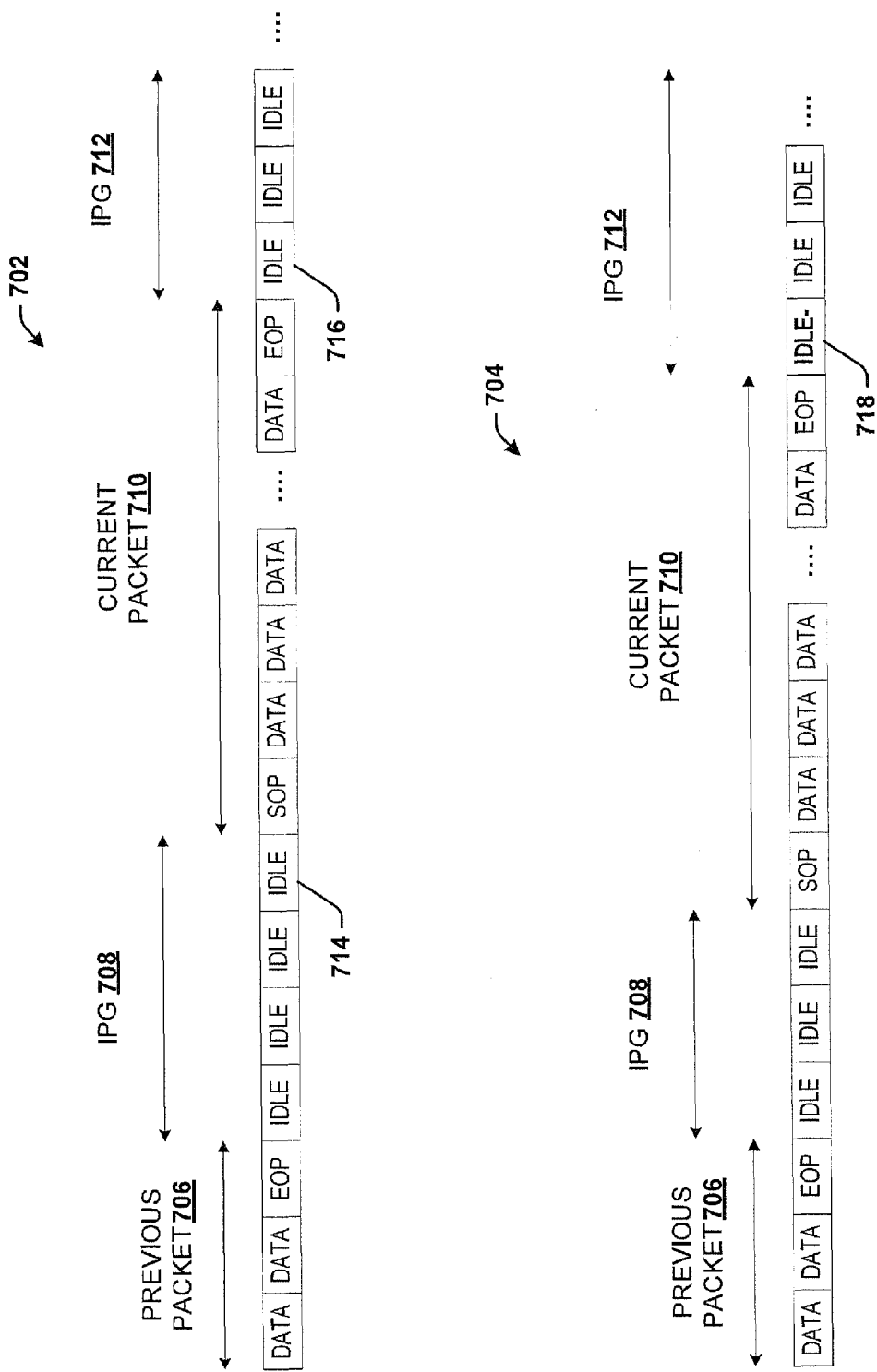
FIG. 7 is a diagram illustrating an example, non-limiting embodiment of a codeword removal process for rate adaptation in accordance with various aspects described herein.

Referring now to FIG. 7, a diagram illustrating an example, non-limiting embodiment of a data stream 702 and a modified version of the data stream 704 in accordance with various aspects described herein is shown. For example, FIG. 7 can illustrate a codeword removal process for a data stream (e.g., a codeword removal process associated with the rate adaptation component 106 and/or the codeword removal component 502). In the non-limiting example shown in FIG. 7, the data stream 702 includes a previous packet 706, an inter-packet gap (IPG) 708, a current packet 710 and an IPG 712. The previous packet 706 includes a SOP block (not shown), a plurality of data blocks and an end of packet (EOP) block. The IPG 708 includes a plurality of idle blocks (e.g., a plurality of idle codewords). For example, the IPG 708 can include four idle blocks. The current packet 710 includes a SOP block, a plurality of data blocks and an EOP block. The IPG 712 includes a plurality of idle blocks (e.g., at least three idle blocks).

The data stream 702 can be transformed into the modified version of the data stream 704 for rate adaptation. For example, the data stream 702 can be a data stream before rate adaptation and the modified version of the data stream 704 can be a data stream (e.g., the data stream 702) after rate adaptation. As such, the modified version of the data stream 704 can be a rate-adapted version of a data stream. In the non-limiting example shown in FIG. 7, a codeword 714 (e.g., a predefined codeword, an idle codeword, etc.) can be removed from the data stream 702 (e.g., removed from the IPG 708). Furthermore, a codeword 716 (e.g., a predefined codeword, an idle codeword, etc.) of the data stream 704 can be transformed into a codeword 718 (e.g., a second identification codeword, an idle− codeword, etc.). For example, the codeword 714 included in the IPG 708 between the previous packet 706 and the current packet 710 of the data stream 702 can be removed from the IPG 708. Furthermore, the codeword 716 included in the IPG 712 after the current packet 710 of the data stream 702 can be transformed into a codeword 718 included in the IPG 712 after the current packet 710.

As such, the IPG 708 of the modified version of the data stream 704 can include three idle blocks (e.g., instead of four idle blocks). Furthermore, the IPG 712 of the modified version of the data stream 704 can include at least two idle blocks and the codeword 718 (e.g., the second identification codeword, the idle− codeword, etc.).

The codeword 718 can identify a codeword that has been removed by a rate adaptation process. In an aspect, the codeword 714 can be removed from the data stream 702 and the codeword 716 can be transformed into the codeword 718 in response to a determination that a clock rate of the data stream 702 is greater than a clock rate associated with a device configured for receiving the data stream 702 (e.g., the modified version of the data stream 704). In one example, the codeword 716 can be transformed into the codeword 718 based on a set of encoding rules. For example, selection of the codeword 716 to be transformed into the codeword 718 can be determined based on a set of encoding rules. In another example, the codeword 716 can be transformed into the codeword 718 based on an algorithm (e.g., a codeword removal algorithm, etc.). In the non-limiting example shown in FIG. 7, the codeword 716 and the codeword 718 are located at a beginning position of the IPG 712. However, it is to be appreciated that the codeword 716 and the codeword 718 can be located at a different position of the IPG 712 (e.g., at an end position of the IPG 712, at a position between a beginning position and an end position of the IPG 712, etc.) or at another IPG.

Figure 8:
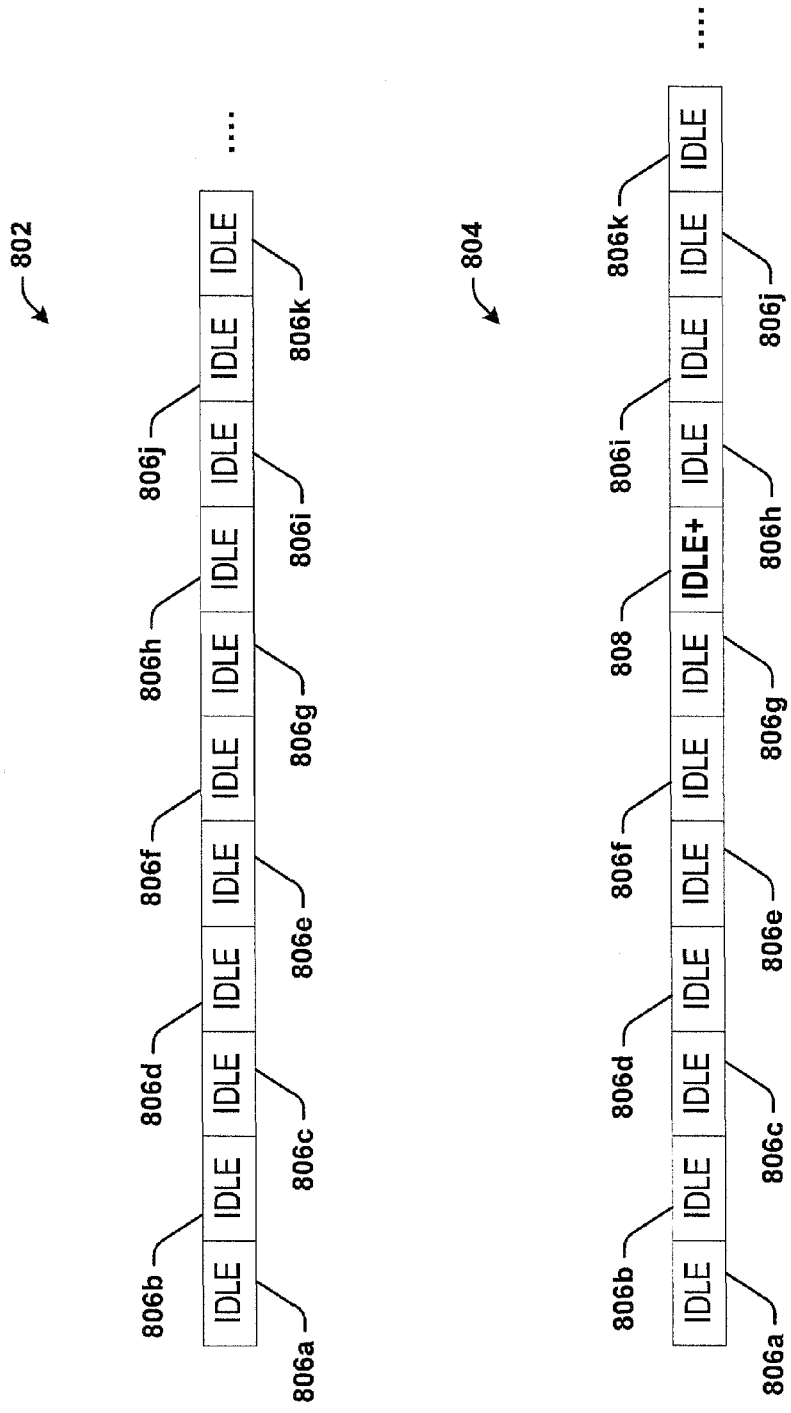
FIG. 8 is a diagram illustrating another example, non-limiting embodiment of a codeword insertion process for rate adaptation in accordance with various aspects described herein.

Referring now to FIG. 8, a diagram illustrating an example, non-limiting embodiment of a data stream 802 and a modified version of the data stream 804 in accordance with various aspects described herein is shown. For example, FIG. 8 can illustrate a codeword insertion process for a data stream (e.g., a codeword insertion process associated with the rate adaptation component 106 and/or the codeword insertion component 402). In the non-limiting example shown in FIG. 8, the data stream 802 includes at least idle blocks 806a-k (e.g., idle codewords 806a-k).

The data stream 802 can be transformed into the modified version of the data stream 804 for rate adaptation. For example, the data stream 802 can be a data stream before rate adaptation and the modified version of the data stream 804 can be a data stream (e.g., the data stream 802) after rate adaptation. As such, the modified version of the data stream 804 can be a rate-adapted version of a data stream. In the non-limiting example shown in FIG. 8, a codeword 808 (e.g., a first identification codeword, an idle+ codeword, etc.) can be added to the data stream 802. As such, the modified version of the data stream 804 can include the codeword 808.

The codeword 808 can identify a codeword that has been inserted by a rate adaptation process. In an aspect, the codeword 808 can be inserted into the data stream 802 in response to a determination that a clock rate of the data stream 802 is lower than a clock rate associated with a device configured for receiving the data stream 802 (e.g., the modified version of the data stream 804). In one example, the codeword 808 can be inserted into the data stream 802 based on a set of encoding rules. For example, a location of the codeword 808 in the data stream 802 can be determined based on a set of encoding rules. In another example, a location of the codeword 808 in the data stream 802 can be determined based on an algorithm (e.g., a codeword insertion algorithm, etc.). In the non-limiting example shown in FIG. 8, the codeword 808 is located between the idle block 806g and the idle block 806h. However, it is to be appreciated that the codeword 808 can be located at a different position in the modified version of the data stream 804.

Figure 9:
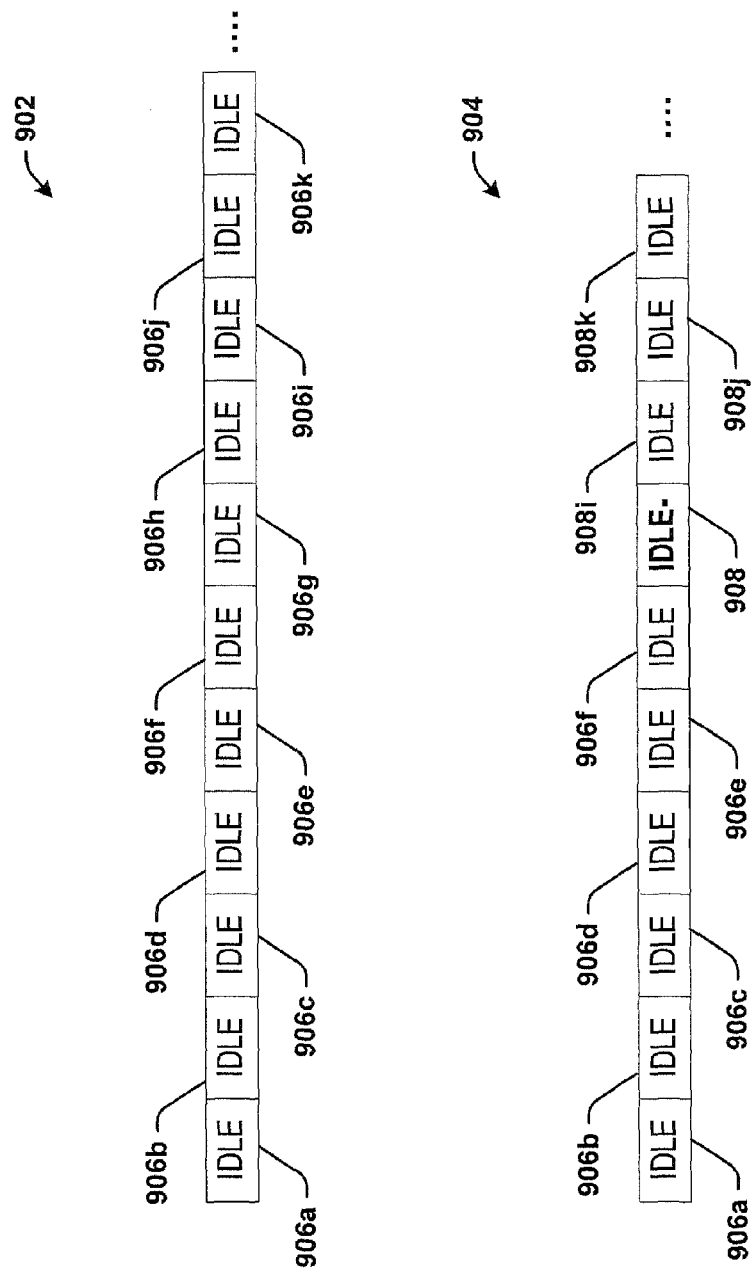
FIG. 9 is a diagram illustrating another example, non-limiting embodiment of a codeword removal process for rate adaptation in accordance with various aspects described herein.

Referring now to FIG. 9, a diagram illustrating an example, non-limiting embodiment of a data stream 902 and a modified version of the data stream 904 in accordance with various aspects described herein is shown. For example, FIG. 9 can illustrate a codeword removal process for a data stream (e.g., a codeword removal process associated with the rate adaptation component 106 and/or the codeword removal component 502). In the non-limiting example shown in FIG. 9, the data stream 902 includes at least idle blocks 906a-k (e.g., idle codewords 906a-k).

The data stream 902 can be transformed into the modified version of the data stream 904 for rate adaptation. For example, the data stream 902 can be a data stream before rate adaptation and the modified version of the data stream 904 can be a data stream (e.g., the data stream 902) after rate adaptation. As such, the modified version of the data stream 904 can be a rate-adapted version of a data stream. In the non-limiting example shown in FIG. 9, the idle block 906g (e.g., the idle codeword 906g) can be removed from the data stream 902. Furthermore, the idle block 906h (e.g., the idle codeword 906h) of the data stream 904 can be transformed into a codeword 908 (e.g., a second identification codeword, an idle– codeword, etc.). For example, the idle block 906g included in the data stream 902 between the idle block 906f and the idle block 906h can be removed from the data stream 902. Furthermore, the idle block 906h located after the idle block 906g can be transformed into a codeword 908. As such, the modified version of the data stream 904 can include idle blocks 906a-f, the codeword 908 and idle blocks 906i-k. Accordingly, the modified version of the data stream 904 can include one less idle block than the data stream 902.

The codeword 908 can identify a codeword that has been removed by a rate adaptation process. In an aspect, the idle block 906g can be removed from the data stream 902 and the idle block 906h can be transformed into the codeword 908 in response to a determination that a clock rate of the data stream 902 is greater than a clock rate associated with a device configured for receiving the data stream 902 (e.g., the modified version of the data stream 904). In one example, the idle block 906h can be transformed into the codeword 908 based on a set of encoding rules. For example, selection of the idle block 906h to be transformed into the codeword 908 can be determined based on a set of encoding rules. In another example, the idle block 906h can be transformed into the codeword 908 based on an algorithm (e.g., a codeword removal algorithm, etc.). It is to be appreciated that a different idle block can be removed from the data stream 902 and/or a different idle block can be transformed into a codeword (e.g., a second identification codeword, an idle– codeword, etc.).

Figure 10:
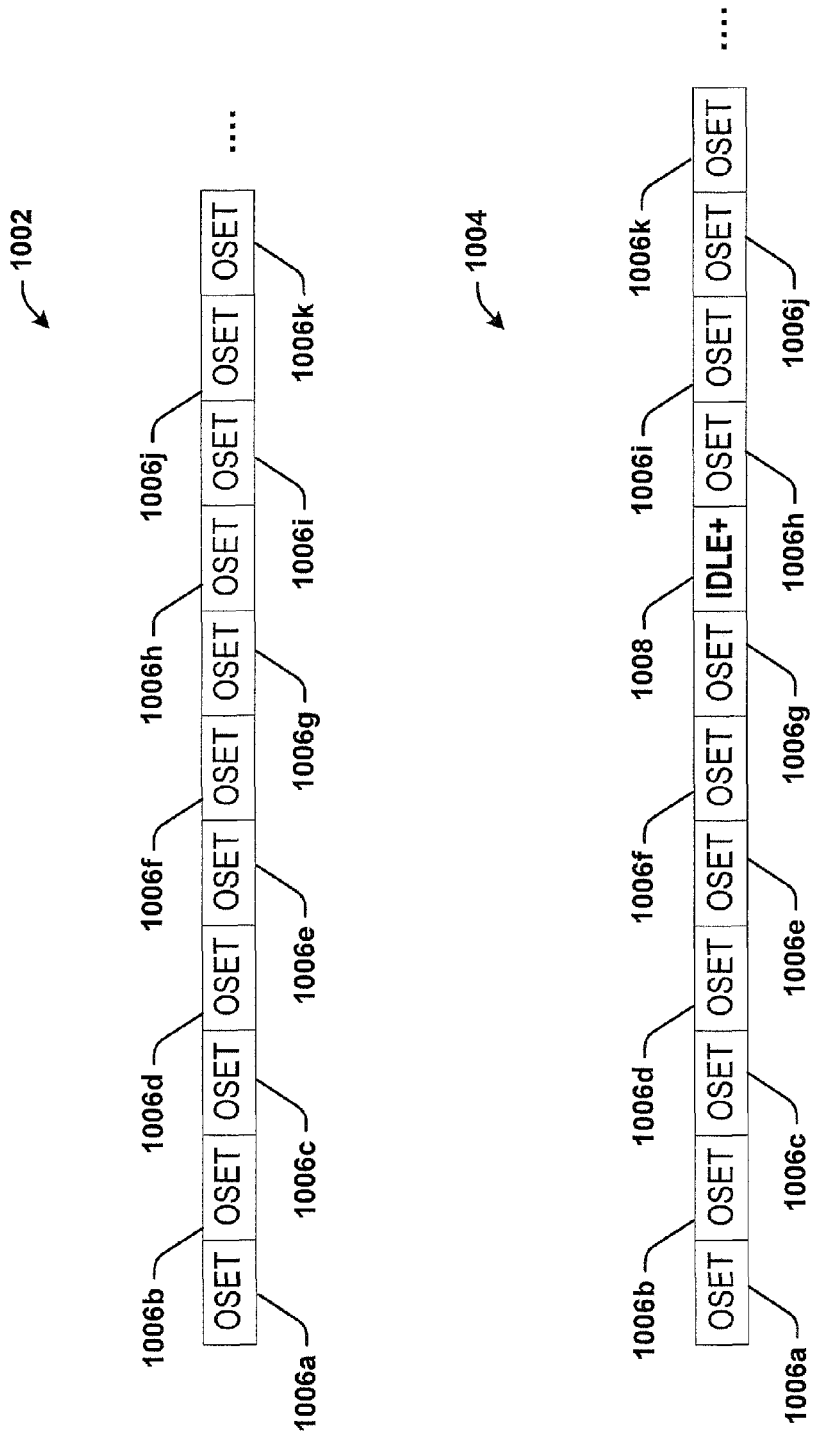
FIG. 10 is a diagram illustrating yet another example, non-limiting embodiment of a codeword insertion process for rate adaptation in accordance with various aspects described herein.

Referring now to FIG. 10, a diagram illustrating an example, non-limiting embodiment of a data stream 1002 and a modified version of the data stream 1004 in accordance with various aspects described herein is shown. For example, FIG. 10 can illustrate another codeword insertion process for a data stream (e.g., a codeword insertion process associated with the rate adaptation component 106 and/or the codeword insertion component 402). In the non-limiting example shown in FIG. 10, the data stream 1002 includes at least ordered set (OSET) blocks 1006a-k (e.g., OSET codewords 1006a-k). An OSET block can be a codeword (e.g., a PCS code) that indicates presence of ordered sets in a data stream. As such, sequence ordered sets can be deleted from a data stream for rate adaptation (e.g., ordered set rate adaptation).

The data stream 1002 can be transformed into the modified version of the data stream 1004 for rate adaptation (e.g., ordered set rate adaptation). For example, the data stream 1002 can be a data stream before rate adaptation and the modified version of the data stream 1004 can be a data stream (e.g., the data stream 1002) after rate adaptation. As such, the modified version of the data stream 1004 can be a rate-adapted version of a data stream. In the non-limiting example shown in FIG. 10, a codeword 1008 (e.g., a first identification codeword, an idle+ codeword, etc.) can be added to the data stream 1002. As such, the modified version of the data stream 1004 can include the codeword 1008.

The codeword 1008 can identify a codeword that has been inserted by a rate adaptation process. In an aspect, the codeword 1008 can be inserted into the data stream 1002 in response to a determination that a clock rate of the data stream 1002 is lower than a clock rate associated with a device configured for receiving the data stream 1002 (e.g., the modified version of the data stream 1004). In one example, the codeword 1008 can be inserted into the data stream 1002 based on a set of encoding rules. For example, a location of the codeword 1008 in the data stream 1002 can be determined based on a set of encoding rules. In another example, a location of the codeword 1008 in the data stream 1002 can be determined based on an algorithm (e.g., a codeword insertion algorithm, etc.). In the non-limiting example shown in FIG. 10, the codeword 1008 is located between the idle block 1006g and the idle block 1006h. However, it is to be appreciated that the codeword 1008 can be located at a different position of the modified version of the data stream 1004.

Figure 11:
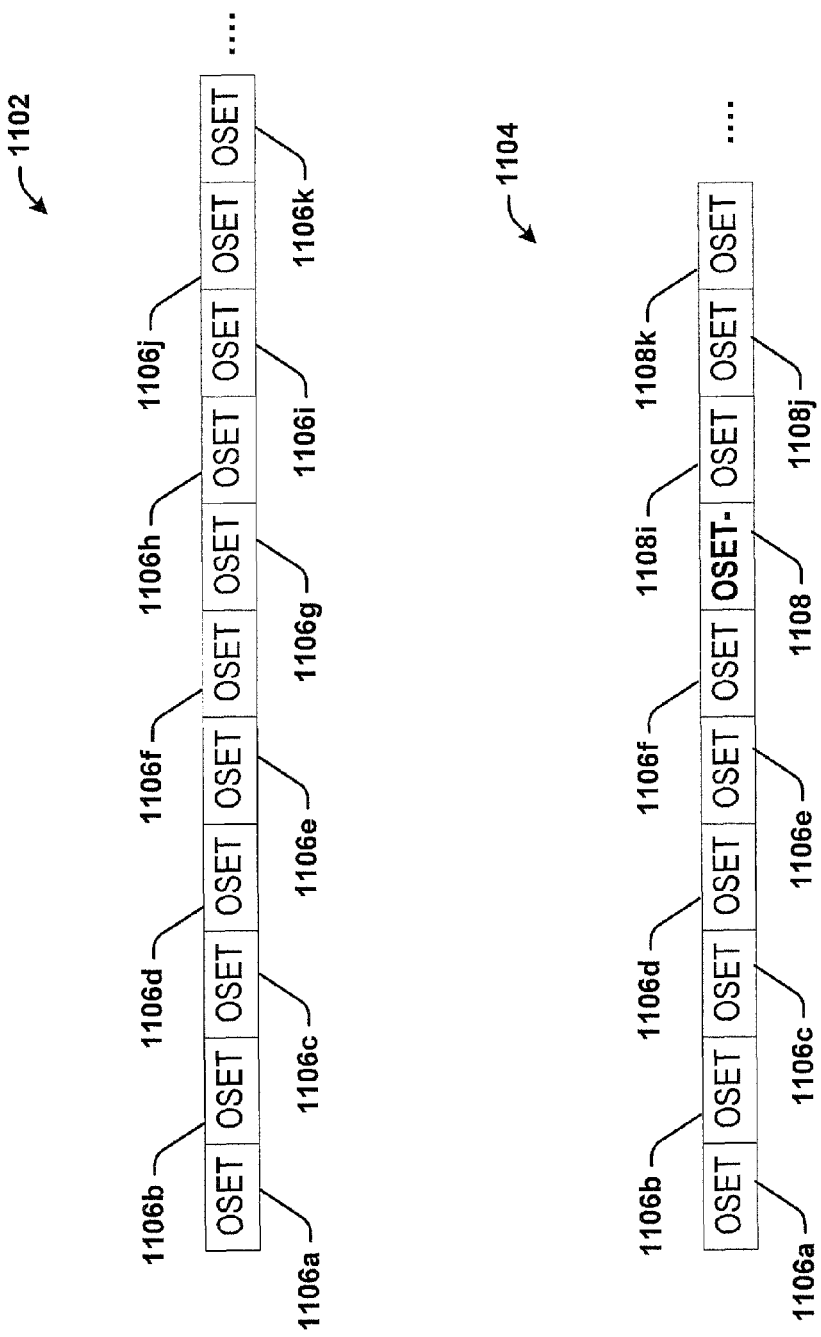
FIG. 11 is a diagram illustrating yet another example, non-limiting embodiment of a codeword removal process for rate adaptation in accordance with various aspects described herein.

Referring now to FIG. 11, a diagram illustrating an example, non-limiting embodiment of a data stream 1102 and a modified version of the data stream 1104 in accordance with various aspects described herein is shown. For example, FIG. 11 can illustrate a codeword removal process for a data stream (e.g., a codeword removal process associated with the rate adaptation component 106 and/or the codeword removal component 502). In the non-limiting example shown in FIG. 11, the data stream 1102 includes at least OSET blocks 1106a-k (e.g., OSET codewords 1106a-k). An OSET block can be a codeword (e.g., a PCS code) that indicates presence of ordered sets in a data stream.

The data stream 1102 can be transformed into the modified version of the data stream 1104 for rate adaptation (e.g., ordered set rate adaptation). For example, the data stream 1102 can be a data stream before rate adaptation and the modified version of the data stream 1104 can be a data stream (e.g., the data stream 1102) after rate adaptation. As such, the modified version of the data stream 1104 can be a rate-adapted version of a data stream. In the non-limiting example shown in FIG. 11, the OSET block 1106*g* (e.g., the OSET codeword 1106*g*) can be removed from the data stream 1102. Furthermore, the OSET block 1106*h* (e.g., the OSET codeword 1106*h*) of the data stream 1104 can be transformed into a codeword 1108 (e.g., a third identification codeword, an OSET-minus codeword, etc.). For example, the OSET block 1106*g* included in the data stream 1102 between the OSET block 1106*f* and the OSET block 1106*h* can be removed from the data stream 1102. Furthermore, the OSET block 1106*h* located after the OSET block 1106*g* can be transformed into a codeword 1108. As such, the modified version of the data stream 1104 can include OSET blocks 1106*a-f*, the codeword 1108 and OSET blocks 1106*i-k*. Accordingly, the modified version of the data stream 1104 can include one less OSET block than the data stream 1102.

The codeword 1108 can identify an ordered set codeword that has been removed by a rate adaptation process. In an aspect, the OSET block 1106*g* can be removed from the data stream 1102 and the OSET block 1106*h* can be transformed into the codeword 1108 in response to a determination that a clock rate of the data stream 1102 is greater than a clock rate associated with a device configured for receiving the data stream 1102 (e.g., the modified version of the data stream 1104). In one example, the OSET block 1106*h* can be transformed into the codeword 1108 based on a set of encoding rules. For example, selection of the OSET block 1106*h* to be transformed into the codeword 1108 can be determined based on a set of encoding rules. In another example, the OSET block 1106*h* can be transformed into the codeword 1108 based on an algorithm (e.g., a codeword removal algorithm, etc.). It is to be appreciated that a different OSET block can be removed from the data stream 1102 and/or a different OSET block can be transformed into a codeword (e.g., a second identification codeword, an idle-minus codeword, etc.).

In view of the example systems described above, methods that may be implemented in accordance with the described subject matter may be better appreciated with reference to the flow charts of FIGS. 12-16. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 12:
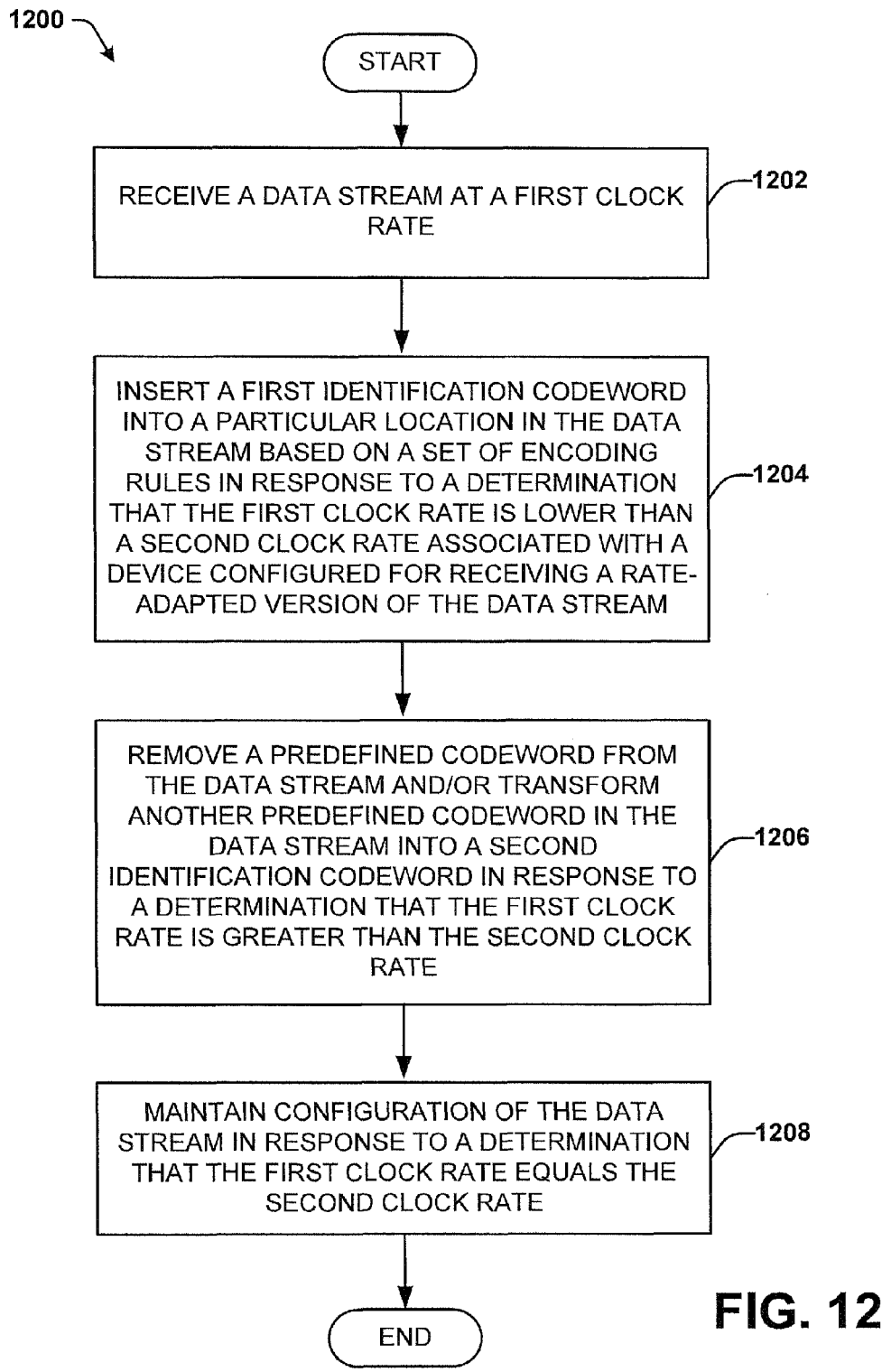
FIG. 12 illustrates a flow diagram of an example, non-limiting embodiment of a method for modifying a data stream for rate adaptation.

Referring now to FIG. 12, a flow diagram of an example, non-limiting embodiment of a method for modifying a data stream for rate adaptation is shown. Method 1200 can begin at block 1202, where a data stream at a first clock rate is received (e.g., by a clock component 104). For example, the data stream can be an encoded data stream (e.g., an encoded signal). In an aspect, the data stream can be associated with a PCS encoding scheme. As such, the data stream can include at least one predefined PCS block.

At block 1204, a first identification codeword is inserted into a particular location in the data stream (e.g., using a rate adaptation component 106) based on a set of encoding rules in response to a determination that the first clock rate is lower than a second clock rate associated with a device configured for receiving a rate-adapted version of the data stream. For example, a first identification codeword can be configured to indicate that a codeword has been inserted into the data stream by a rate adaptation process.

At block 1206, a predefined codeword is removed from the data stream (e.g., using a rate adaptation component 106) and/or another predefined codeword in the data stream is transformed into a second identification codeword (e.g., using a rate adaptation component 106) in response to a determination that the first clock rate is greater than the second clock rate. For example, a second identification codeword can be configured to indicate that a codeword has been removed from the data stream by a rate adaptation process. A predefined codeword can indicate that a payload is not present at a particular portion in the data stream. Alternatively, a predefined codeword can indicate presence of an ordered set at a particular portion in the data stream.

At block 1208, configuration of the data stream is maintained (e.g., by a rate adaptation component 106) in response to a determination that the first clock rate equals the second clock rate. For example, the data stream is not modified for rate adaptation in response to a determination that the first clock rate equals the second clock rate.

Figure 13:
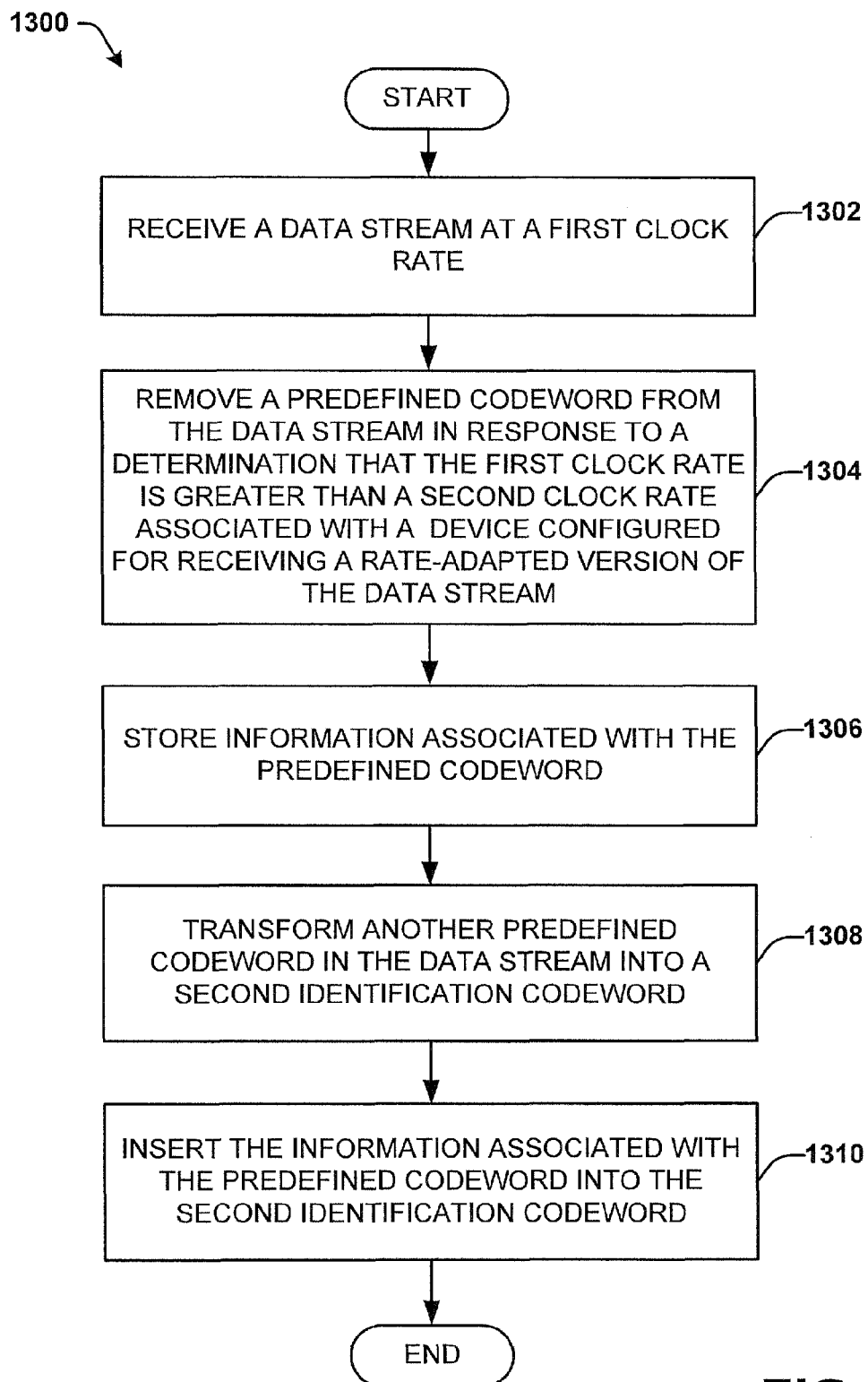
FIG. 13 illustrates a flow diagram of an example, non-limiting embodiment of a method for removing a codeword from a data stream for rate adaptation.

Referring now to FIG. 13, a flow diagram of an example, non-limiting embodiment of a method for removing a codeword from a data stream for rate adaptation is shown. Method 1300 can begin at block 1302, where a data stream at a first clock rate is received (e.g., by a clock component 104). At block 1304, a predefined codeword from the data stream is removed (e.g., using a rate adaptation component 106) in response to a determination that the first clock rate is greater than a second clock rate associated with a device configured for receiving a rate-adapted version of the data stream. At block 1306, information associated with the predefined codeword is stored (e.g., by a memory component 302). At block 1308, another predefined codeword in the data stream is transformed into a second identification codeword (e.g., using a rate adaptation component 106). At block 1310, the information associated with the predefined codeword is inserted into the second identification codeword (e.g., using a rate adaptation component 106).

Figure 14:
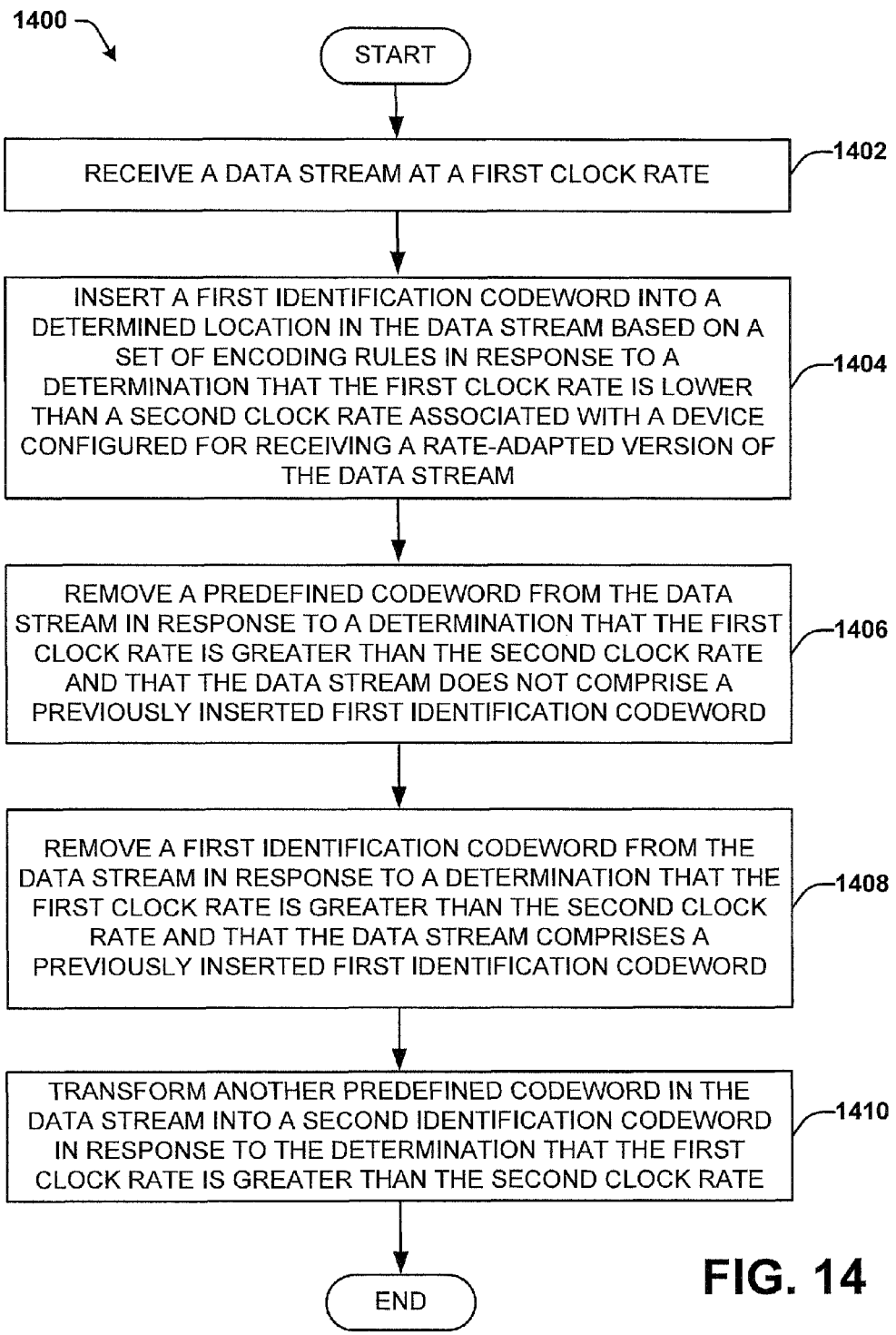
FIG. 14 illustrates a flow diagram of another example, non-limiting embodiment of a method for modifying a data stream for rate adaptation.

Referring now to FIG. 14, a flow diagram of another example, non-limiting embodiment of a method for modifying a data stream for rate adaptation is shown. Method 1400 can begin at block 1402, where a data stream at a first clock rate is received (e.g., by a clock component 104). At block 1404, a first identification codeword is inserted into a determined location in the data stream (e.g., using a rate adaptation component 106) based on a set of encoding rules in response to a determination that the first clock rate is lower than a second clock rate associated with a device configured for receiving a rate-adapted version of the data stream. At block 1406, a predefined codeword is removed from the data stream (e.g., using a rate adaptation component 106) in response to a determination that the first clock rate is greater than the second clock rate and that the data stream does not comprise a previously inserted first identification codeword. At block 1408, a first identification codeword is removed from the data stream (e.g., using a rate adaptation component 106) in response to a determination that the first clock rate is greater than the second clock rate and that the data stream comprises a previously inserted first identification codeword. At block 1410, another predefined codeword in the data stream is transformed into a second identification codeword (e.g., using a rate adaptation component 106) in response to the determination that the first clock rate is greater than the second clock rate.

Figure 15:
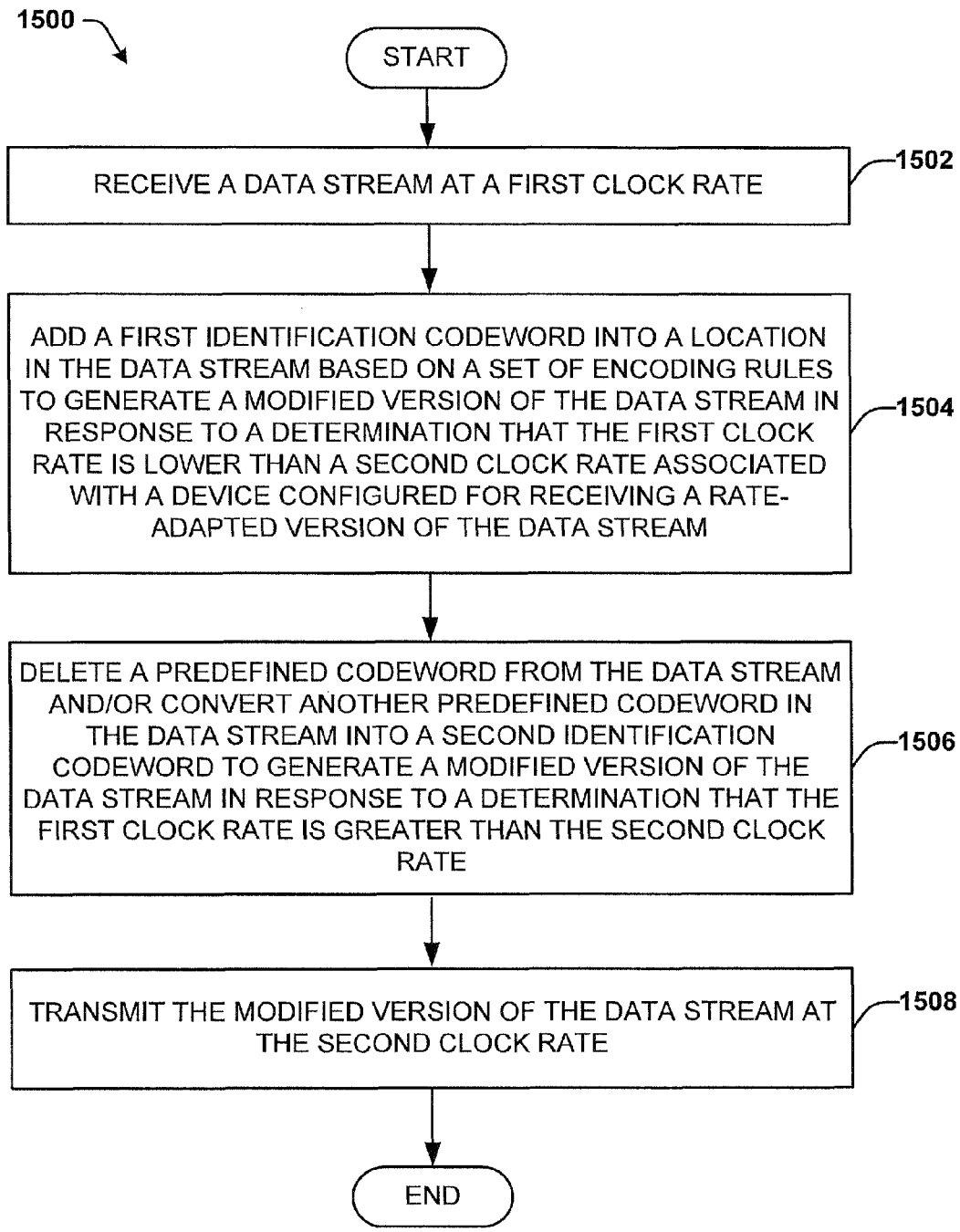
FIG. 15 illustrates a flow diagram of yet another example, non-limiting embodiment of a method for modifying a data stream for rate adaptation.

Referring now to FIG. 15, a flow diagram of yet another example, non-limiting embodiment of a method for modifying a data stream for rate adaptation is shown. Method 1500 can begin at block 1502, where a data stream at a first clock rate is received (e.g., by a clock component 104). At block 1504, a first identification codeword is added into a location in the data stream (e.g., using a rate adaptation component 106) based on a set of encoding rules to generate a modified version of the data stream in response to a determination that the first clock rate is lower than a second clock rate associated with a device configured for receiving a rate-adapted version of the data stream. At block 1506, a predefined codeword from the data stream is deleted (e.g., using a rate adaptation component 106) and/or another predefined codeword in the data stream is converted into a second identification codeword (e.g., using a rate adaptation component 106) to generate a modified version of the data stream in response to a determination that the first clock rate is greater than the second clock rate. At block 1508, the modified version of the data stream is transmitted at the second clock rate (e.g., using a rate adaptation component 106).

Figure 16:
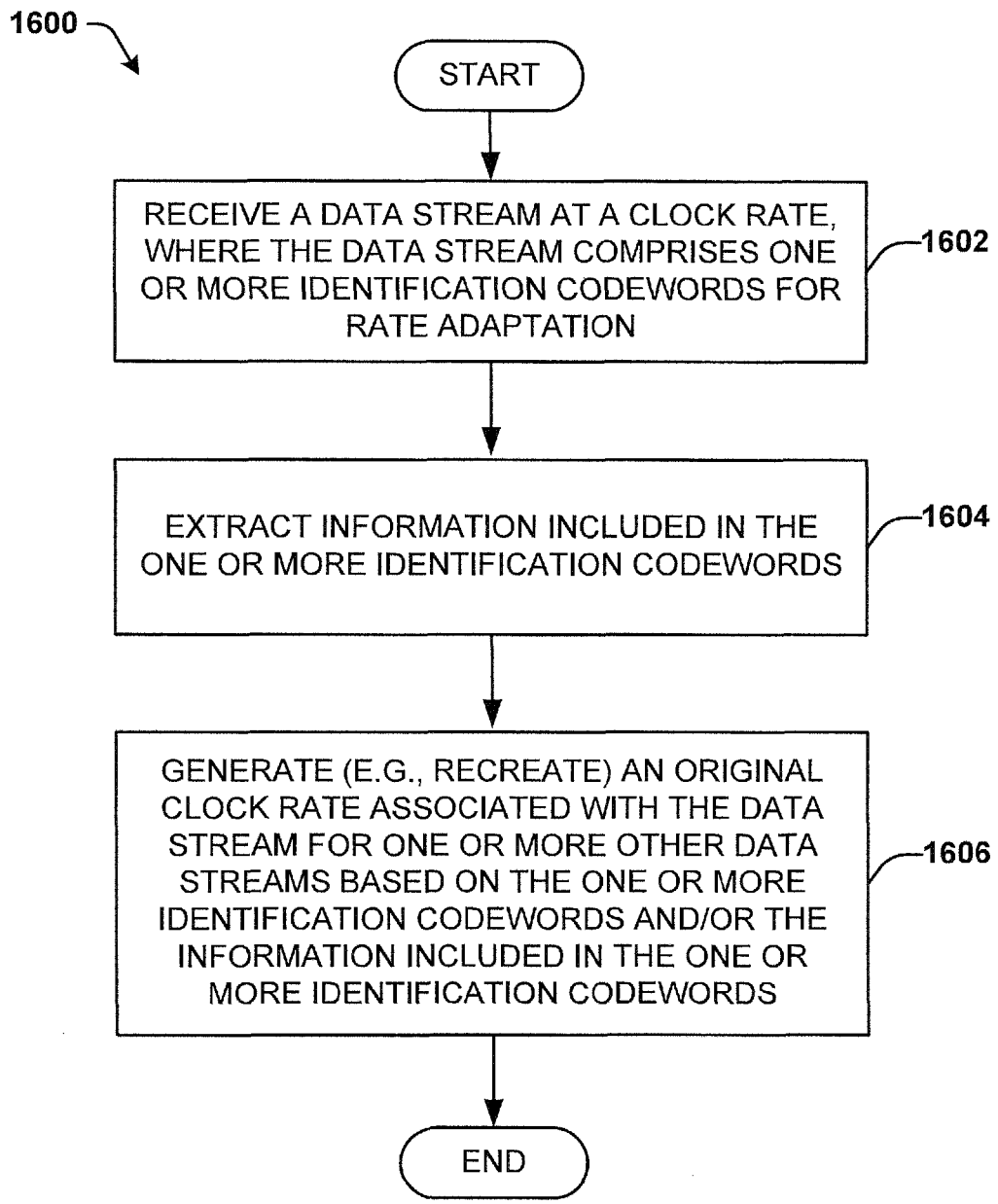
FIG. 16 illustrates a flow diagram of an example, non-limiting embodiment of a method for receiving a modified version of a data stream.

Referring now to FIG. 16, a flow diagram of an example, non-limiting embodiment of a method for receiving a modified version of a data stream is shown. Method 1600 can begin at block 1602, where a data stream at a clock rate is received (e.g., by a device 108). The data stream comprises one or more identification codewords for rate adaptation. At block 1604, information included in the one or more identification codewords is extracted (e.g., by a device 108). At block 1606, an original clock rate associated with the data stream is generated (e.g., recreated) for one or more other data streams based on the one or more identification codewords and/or the information included in the one or more identification codewords (e.g., using a device 108).

Example Computing Environment

Figure 17:
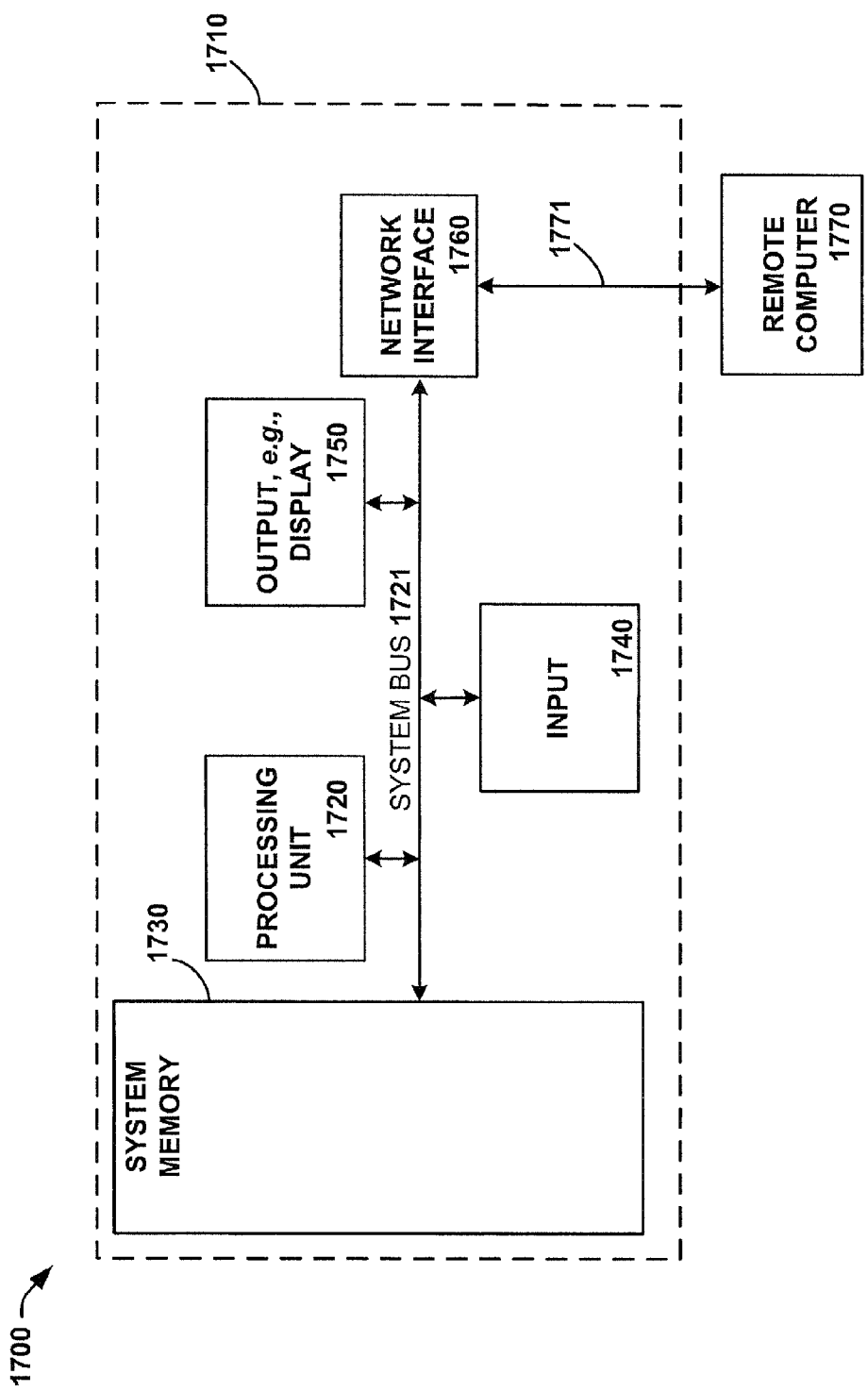
FIG. 17 illustrates a block diagram of an example electronic computing environment that can be implemented in conjunction with one or more aspects described herein.

As mentioned, advantageously, the techniques described herein can be applied to any device and/or network where it is desirable to employ one or more identification codewords for a rate-adapted version of a data stream. It is to be understood, therefore, that handheld, portable and other computing devices and computing objects of all kinds are contemplated for use in connection with the various non-limiting embodiments. Accordingly, the below general purpose remote computer described below in FIG. 17 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 17 thus illustrates an example of a suitable computing system environment 1700 in which some aspects of the disclosed subject matter can be implemented, although as made clear above, the computing system environment 1700 is only one example of a suitable computing environment for a device and is not intended to suggest any limitation as to the scope of use or functionality of the disclosed subject matter. Neither should the computing environment 1700 be interpreted as having any dependency or requirement relating to any one or combination of components illustrated in the exemplary operating environment 1700.

With reference to FIG. 17, an exemplary device for implementing the disclosed subject matter includes a general-purpose computing device in the form of a computer 1710. Components of computer 1710 may include, but are not limited to, a processing unit 1720, a system memory 1730, and a system bus 1721 that couples various system components including the system memory to the processing unit 1720. The system bus 1721 may be any of several types of bus structures including a memory bus or memory controller, a peripheral bus, and a local bus using any of a variety of bus architectures.

Computer 1710 typically includes a variety of computer readable media. Computer readable media can be any available media that can be accessed by computer 1710. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1710. Communication media typically embodies computer readable instructions, data structures, program modules, or other data in a modulated data signal such as a carrier wave or other transport mechanism and includes any information delivery media.

The system memory 1730 may include computer storage media in the form of volatile and/or nonvolatile memory such as read only memory (ROM) and/or random access memory (RAM). A basic input/output system (BIOS), containing the basic routines that help to transfer information between elements within computer 1710, such as during start-up, may be stored in memory 1730. Memory 1730 typically also contains data and/or program modules that are immediately accessible to and/or presently being operated on by processing unit 1720. By way of example, and not limitation, memory 1730 may also include an operating system, application programs, other program modules, and program data.

The computer 1710 may also include other removable/non-removable, volatile/nonvolatile computer storage media. For example, computer 1710 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1721 through a non-removable memory interface such as an interface, and a magnetic disk drive or optical disk drive is typically connected to the system bus 1721 by a removable memory interface, such as an interface.

A user can enter commands and information into the computer 1710 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1720 through user input 1740 and associated interface(s) that are coupled to the system bus 1721, but may be connected by other interface and bus structures, such as a parallel port, game port, or a universal serial bus (USB). A graphics subsystem can also be connected to the system bus 1721. A projection unit in a projection display device, or a HUD in a viewing device or other type of display device can also be connected to the system bus 1721 via an interface, such as output interface 1750, which may in turn communicate with video memory. In addition to a monitor, computers can also include other peripheral output devices such as speakers which can be connected through output interface 1750.

The computer 1710 can operate in a networked or distributed environment using logical connections to one or more other remote computer(s), such as remote computer 1770, which can in turn have media capabilities different from device 1710. The remote computer 1770 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1710. The logical connections depicted in FIG. 17 include a network 1771, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1710 can be connected to the LAN 1771 through a network interface 1760 or adapter. When used in a WAN networking environment, the computer 1710 can typically include a communications component, such as a modem, or other means for establishing communications over the WAN, such as the Internet. A communications component, such as wireless communications component, a modem and so on, which can be internal or external, can be connected to the system bus 1721 via the user input interface of input 1740, or other appropriate mechanism. In a networked environment, program modules depicted relative to the computer 1710, or portions thereof, can be stored in a remote memory storage device. It will be appreciated that the network connections shown and described are exemplary and other means of establishing a communications link between the computers can be used.

Example Networking Environment

Figure 18:
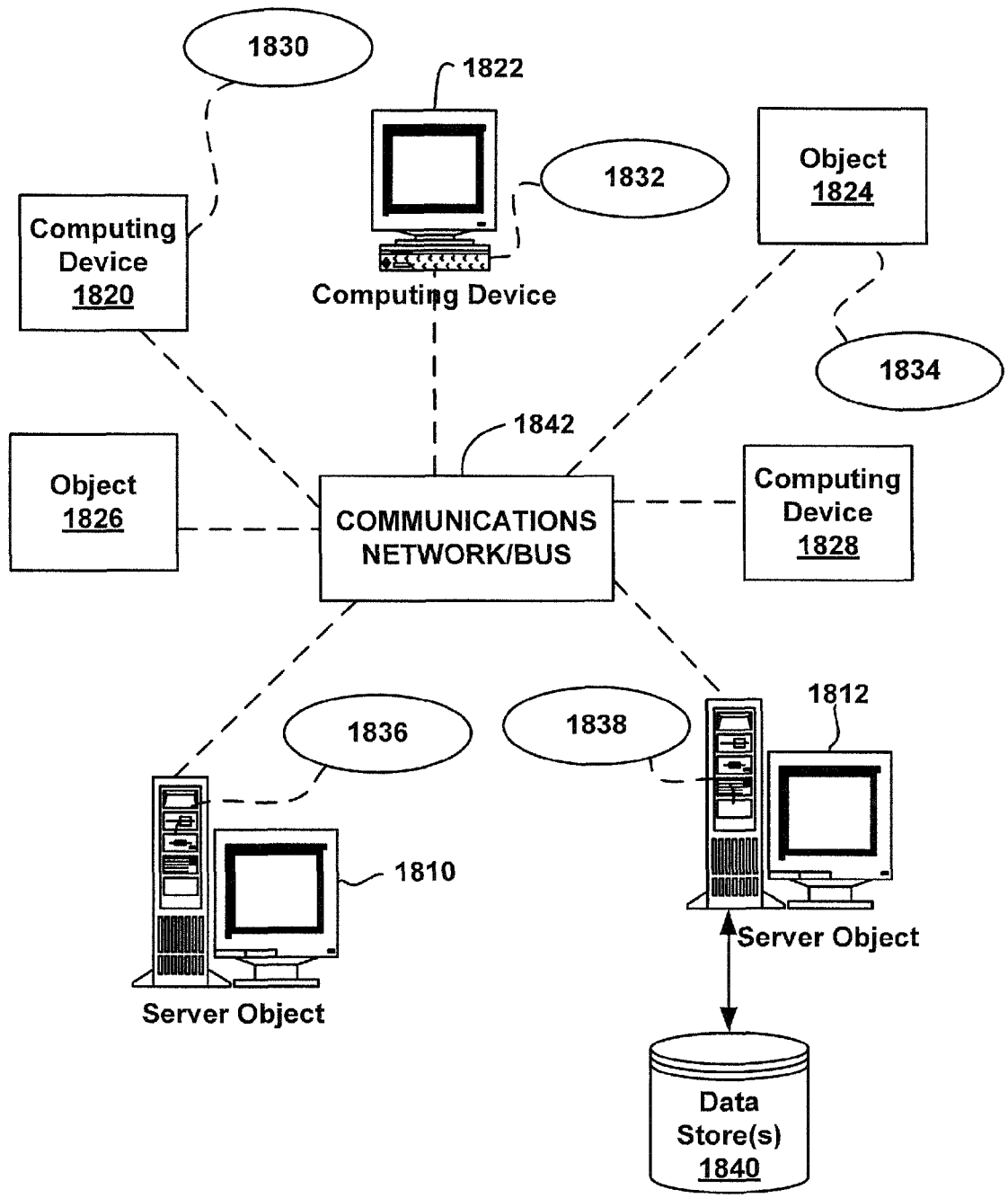
FIG. 18 illustrates a block diagram of an example data communication network that can be operable in conjunction with various aspects described herein.

FIG. 18 provides a schematic diagram of an exemplary networked or distributed computing environment. The distributed computing environment comprises computing objects 1810, 1812, etc. and computing objects or devices 1820, 1822, 1824, 1826, 1828, etc., which may include programs, methods, data stores, programmable logic, etc., as represented by applications 1830, 1832, 1834, 1836, 1838 and data store(s) 1840. It can be appreciated that computing objects 1810, 1812, etc. and computing objects or devices 1820, 1822, 1824, 1826, 1828, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1840 can include registers, or other similar data stores disclosed herein.

Each computing object 1810, 1812, etc. and computing objects or devices 1820, 1822, 1824, 1826, 1828, etc. can communicate with one or more other computing objects 1810, 1812, etc. and computing objects or devices 1820, 1822, 1824, 1826, 1828, etc. by way of the communications network 1842, either directly or indirectly. Even though illustrated as a single element in FIG. 18, communications network 1842 may comprise other computing objects and computing devices that provide services to the system of FIG. 18, and/or may represent multiple interconnected networks, which are not shown. Each computing object 1810, 1812, etc. or computing object or devices 1820, 1822, 1824, 1826, 1828, etc. can also contain an application, such as applications 1830, 1832, 1834, 1836, 1838, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 18, as a non-limiting example, computing objects or devices 1820, 1822, 1824, 1826, 1828, etc. can be thought of as clients and computing objects 1810, 1812, etc. can be thought of as servers where computing objects 1810, 1812, etc., acting as servers provide data services, such as receiving data from client computing objects or devices 1820, 1822, 1824, 1826, 1828, etc., storing of data, processing of data, transmitting data to client computing objects or devices 1820, 1822, 1824, 1826, 1828, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1842 or bus is the Internet, for example, the computing objects 1810, 1812, etc. can be Web servers with which other computing objects or devices 1820, 1822, 1824, 1826, 1828, etc. communicate via any of a number of known protocols, such as the hypertext transfer protocol (HTTP). Computing objects 1810, 1812, etc. acting as servers may also serve as clients, e.g., computing objects or devices 1820, 1822, 1824, 1826, 1828, etc., as may be characteristic of a distributed computing environment.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
a memory storing computer executable components; and
a processor operably connected to the memory and configured to execute the computer executable components comprising:
   a clock component configured for receiving a data stream at a first clock rate; and
   a rate adaptation component configured for inserting a first identification codeword into a particular location in the data stream based on a set of encoding rules in response to a determination that the first clock rate is lower than a second clock rate associated with a device configured for receiving a rate-adapted version of the data stream, and for transforming another predefined codeword in the data stream into a second identification codeword in response to a different determination that the first clock rate is greater than the second clock rate.

2. The system of claim 1, wherein the rate adaptation component is further configured for inserting the first identification codeword into a valid position of the data stream in response to the determination that the first clock rate is lower than the second clock rate.

3. The system of claim 1, wherein the rate adaptation component is further configured for removing a predefined codeword from the data stream in response to the different determination that the first clock rate is greater than the second clock rate.

4. The system of claim 3, wherein the rate adaptation component is further configured for storing information associated with the predefined codeword until a first opportunity to transform the other predefined codeword is available.

5. The system of claim 4, wherein the rate adaptation component is further configured for storing the information associated with the predefined codeword in a finite state machine.

6. The system of claim 1, wherein the first identification codeword and the second identification codeword are control blocks associated with rate adaptation.

7. The system of claim 1, wherein the first identification codeword comprises a total number of identification codewords inserted into the data stream and the second identification codeword comprises a total number of predefined codewords removed from the data stream.

8. The system of claim 3, wherein the predefined codeword is configured for indicating that a payload is not present in the data stream.

9. The system of claim 3, wherein the predefined codeword is configured for indicating presence of an ordered set in the data stream.

10. The system of claim 1, wherein the first identification codeword is configured for indicating a codeword that has been inserted by a rate adaptation process.

11. The system of claim 1, wherein the second identification codeword is configured for indicating a codeword that has been deleted by a rate adaptation process.

12. The system of claim 1, wherein the rate adaptation component is further configured for removing a previously inserted identification codeword from the data stream in response to a determination that the first clock rate is greater than the second clock rate and that the data stream comprises the previously inserted identification codeword.

13. A computer implemented method, comprising:
receiving a data stream in a computer system at a first clock rate;
inserting a first identification codeword into a determined location in the data stream in the computer system in response to a determination that the first clock rate is lower than a second clock rate associated with a device configured for receiving a rate-adapted version of the data stream; and
transforming another predefined codeword in the data stream into a second identification codeword in response to a different determination that the first clock rate is greater than the second clock rate.

14. The computer implemented method of claim 13, further comprising:
removing a predefined codeword from the data stream in response to the different determination that the first clock rate is greater than the second clock rate.

15. The computer implemented method of claim 14, further comprising:
storing information associated with the predefined codeword in a finite state machine.

16. The computer implemented method of claim 13, further comprising:
removing a predefined codeword from the data stream in response to a determination that the first clock rate is greater than the second clock rate and that the data stream comprises the first identification codeword; and
removing a previously inserted identification codeword from the data stream in response to a determination that the first clock rate is greater than the second clock rate and that the data stream comprises the previously inserted identification codeword.

17. A system, comprising:
means for receiving a data stream at a first clock rate;
means for adding a first identification codeword into a valid location in the data stream based on a set of encoding rules in response to a determination that the first clock rate is lower than a second clock rate; and
means for transforming another predefined codeword in the data stream into a second identification codeword in response to a different determination that the first clock rate is greater than the second clock rate.

18. The system of claim 17, further comprising:
means for removing a predefined codeword from the data stream.

19. The system of claim 18, further comprising:
means for storing information associated with the predefined codeword in a finite state machine.

20. The system of claim 17, further comprising:
means for removing a predefined codeword from the data stream; and
means for removing a previously inserted identification codeword from the data stream in response to a determination that the first clock rate is greater than the second clock rate and that the data stream comprises the previously inserted identification codeword.

* * * * *